(12) United States Patent
Mori

(10) Patent No.: US 10,732,673 B2
(45) Date of Patent: Aug. 4, 2020

(54) ELECTRONIC DEVICE

(71) Applicant: Panasonic Intellectual Property Management Co., Ltd., Osaka (JP)

(72) Inventor: Takeshi Mori, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 16/541,272

(22) Filed: Aug. 15, 2019

(65) Prior Publication Data

US 2019/0369666 A1 Dec. 5, 2019

Related U.S. Application Data

(63) Continuation of application No. PCT/JP2018/005679, filed on Feb. 19, 2018.

(30) Foreign Application Priority Data

Feb. 24, 2017 (JP) .................................. 2017-034068

(51) Int. Cl.
*G06F 1/16* (2006.01)

(52) U.S. Cl.
CPC .......... *G06F 1/1632* (2013.01); *G06F 1/1626* (2013.01)

(58) Field of Classification Search
None
See application file for complete search history.

(56) References Cited

U.S. PATENT DOCUMENTS

| 5,852,594 | A | 12/1998 | Kaise |
| 6,560,103 | B1 | 5/2003 | Dohi |
| 9,141,146 | B2 * | 9/2015 | Ke .................. G06F 1/1632 |
| 9,970,590 | B1 * | 5/2018 | Kuo .................. F16M 11/10 |

(Continued)

FOREIGN PATENT DOCUMENTS

| JP | 08-175279 A | 7/1996 |
| JP | 09-237978 A | 9/1997 |

(Continued)

OTHER PUBLICATIONS

International Search Report for corresponding Application No. PCT/JP2018/005679, dated Apr. 10, 2018.

*Primary Examiner* — Xanthia C Cunningham

(74) *Attorney, Agent, or Firm* — Renner, Otto, Boisselle & Sklar, LLP

(57) ABSTRACT

An electronic device includes a first unit having an engaging target part and a second unit having a lock mechanism. The lock mechanism includes an operation member movable between a first position and a second position, an engagement part, and a drive mechanism that drives the engagement part. The drive mechanism includes a moving member causing the engagement part to be engaged with the engaging target part when the moving member is located at a first moving position and causing the engagement part to be disengaged from the engaging target part when the moving member is located at the second moving position. The lock mechanism has a holding mechanism holds the moving member at the second moving position when the operation member is moved to the second position, and releases of the moving member held at the second moving position when the first unit is attached to the second unit.

2 Claims, 32 Drawing Sheets

(56) References Cited

U.S. PATENT DOCUMENTS

| | | | |
|---|---|---|---|
| 10,303,216 B1* | 5/2019 | Powell | G06F 1/1654 |
| 10,585,455 B1* | 3/2020 | Barnes | H05K 5/0008 |
| 2008/0003860 A1* | 1/2008 | Carnevali | G06F 1/1632 |
| | | | 439/296 |
| 2013/0058065 A1* | 3/2013 | Minaguchi | H04N 5/64 |
| | | | 361/807 |
| 2014/0133080 A1* | 5/2014 | Hwang | G06F 1/1632 |
| | | | 361/679.17 |
| 2014/0185231 A1* | 7/2014 | Kamimura | G06F 1/20 |
| | | | 361/679.47 |
| 2014/0211108 A1* | 7/2014 | Matsumoto | F16M 11/041 |
| | | | 349/12 |
| 2014/0347815 A1 | 11/2014 | Yamazaki | |
| 2014/0355196 A1 | 12/2014 | Hashimoto | |
| 2015/0055289 A1* | 2/2015 | Chang | G06F 1/1632 |
| | | | 361/679.43 |
| 2016/0236493 A1* | 8/2016 | Lyman | B41J 29/023 |
| 2018/0046218 A1* | 2/2018 | Iwamoto | E05B 73/0082 |

FOREIGN PATENT DOCUMENTS

| | | |
|---|---|---|
| JP | 11-338578 A | 12/1999 |
| JP | 2000-105632 A | 4/2000 |
| JP | 2006-169720 A | 6/2006 |
| JP | 2011-025716 A | 2/2011 |
| JP | 2014-229201 A | 12/2014 |
| JP | 2014-236009 A | 12/2014 |

\* cited by examiner

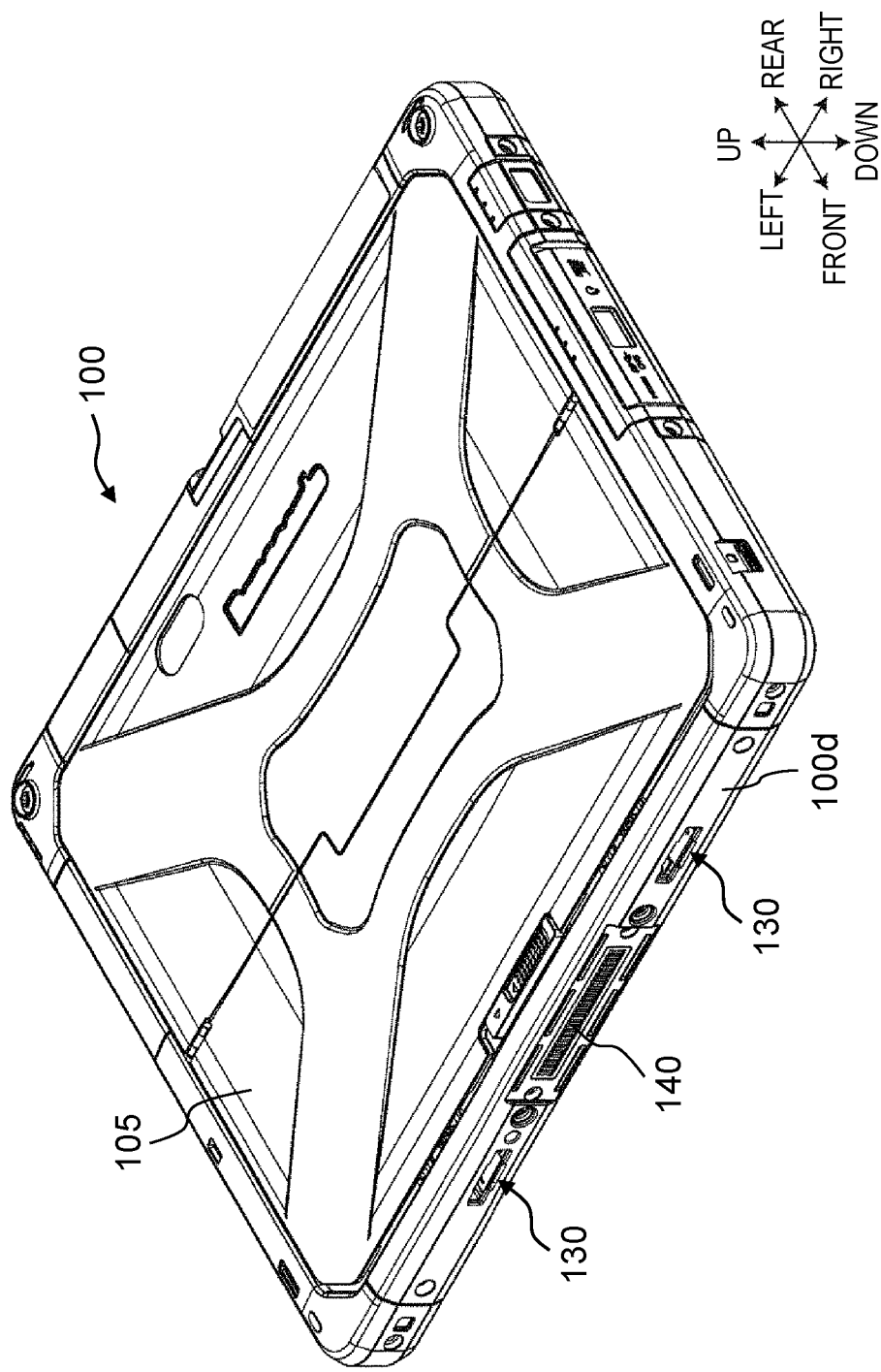

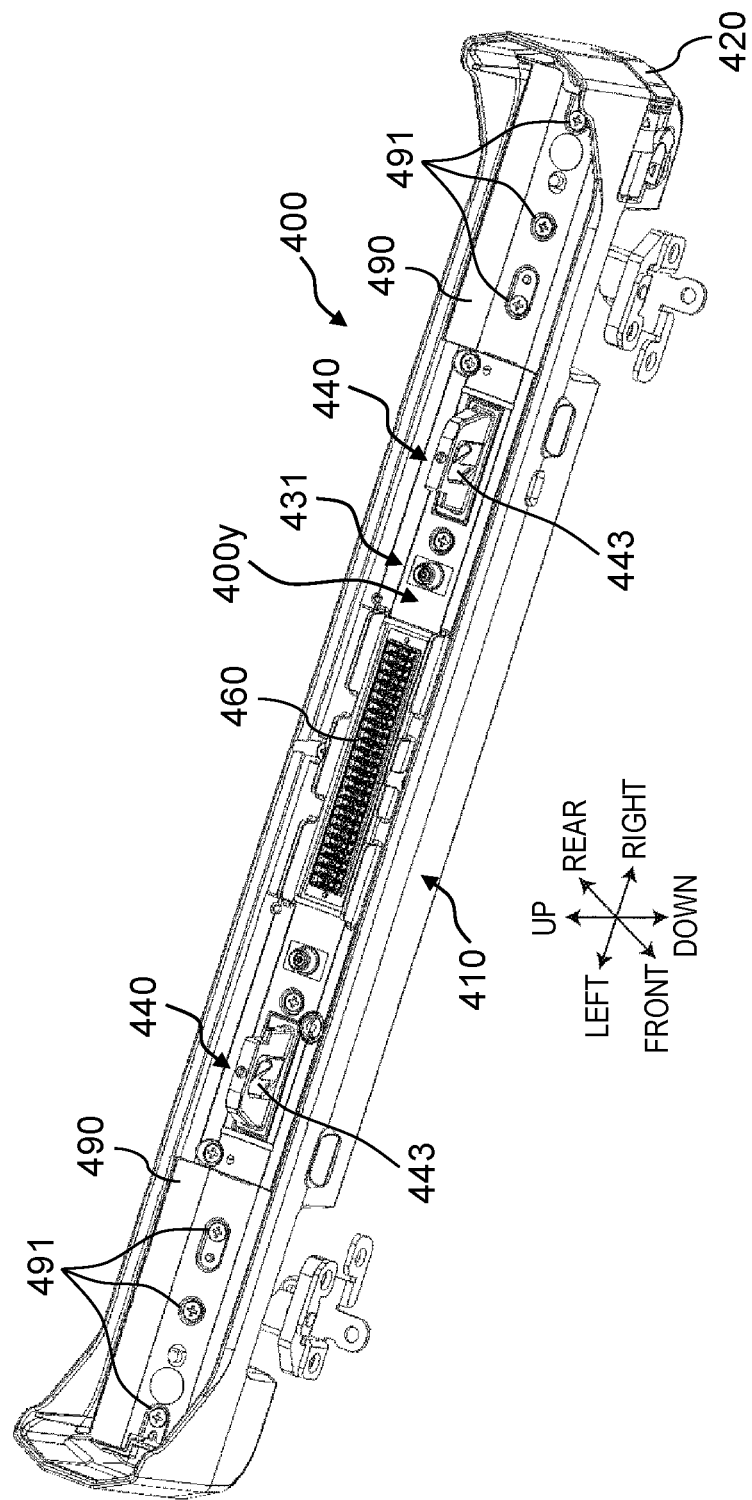

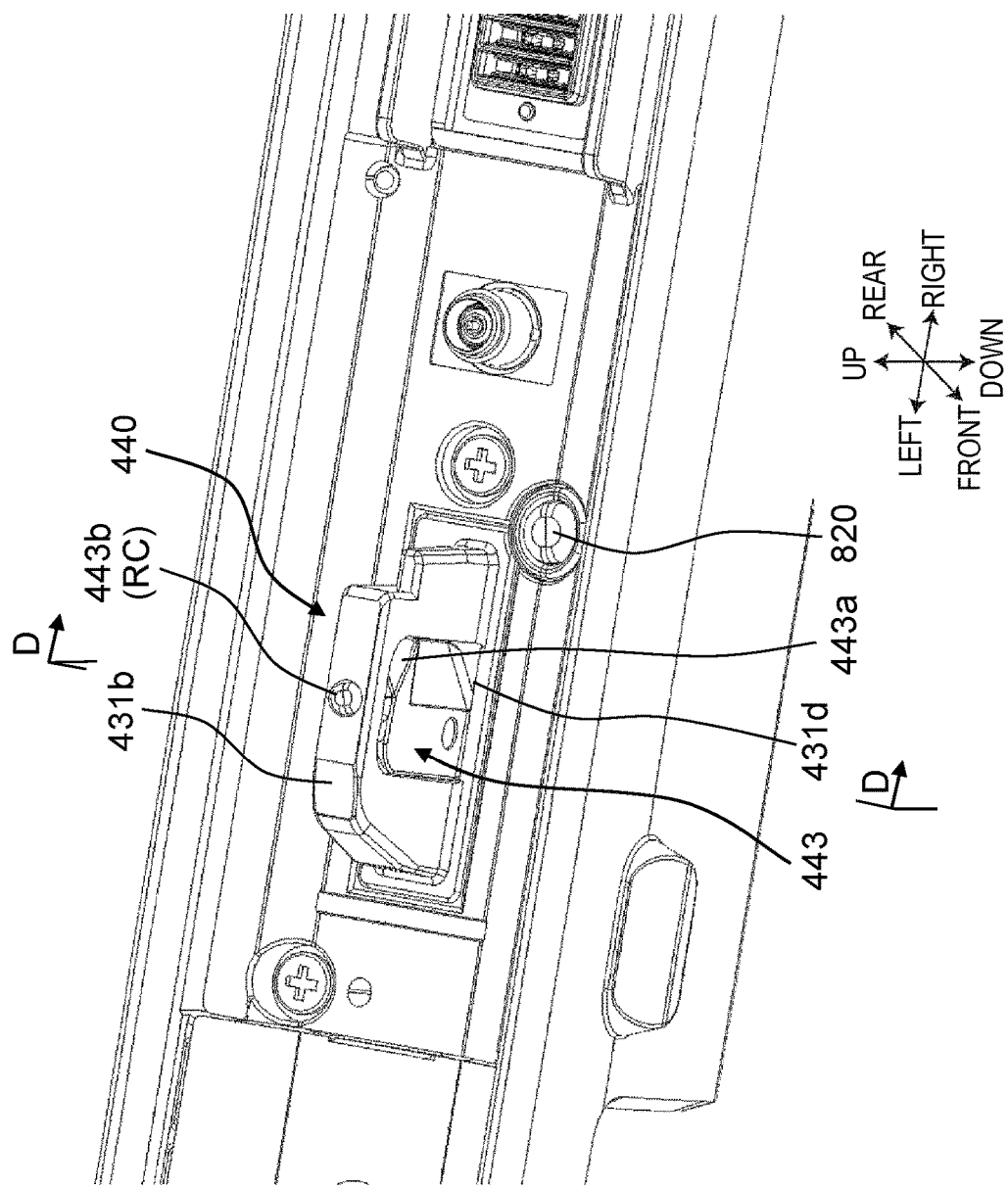

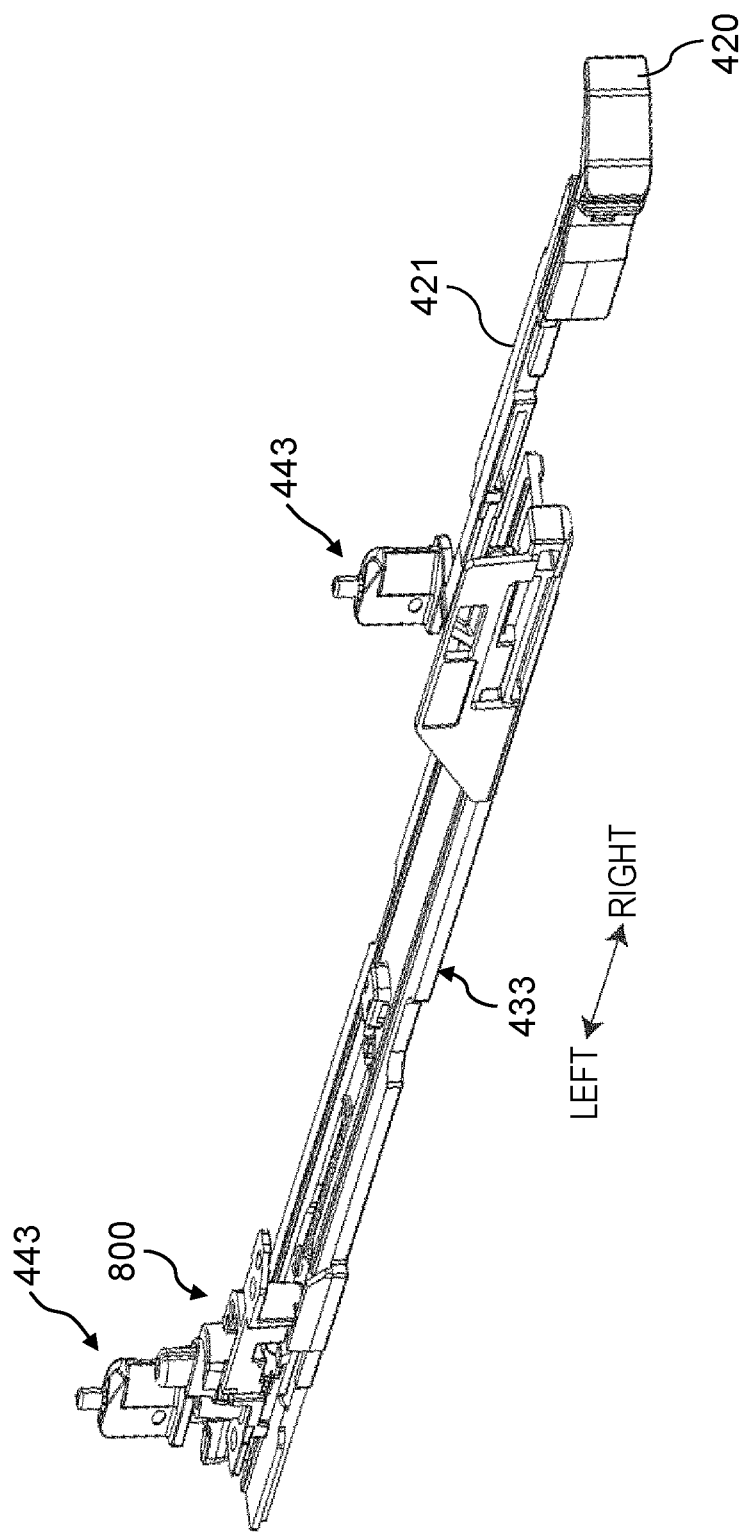

(a)

(b)

(a)

(b)

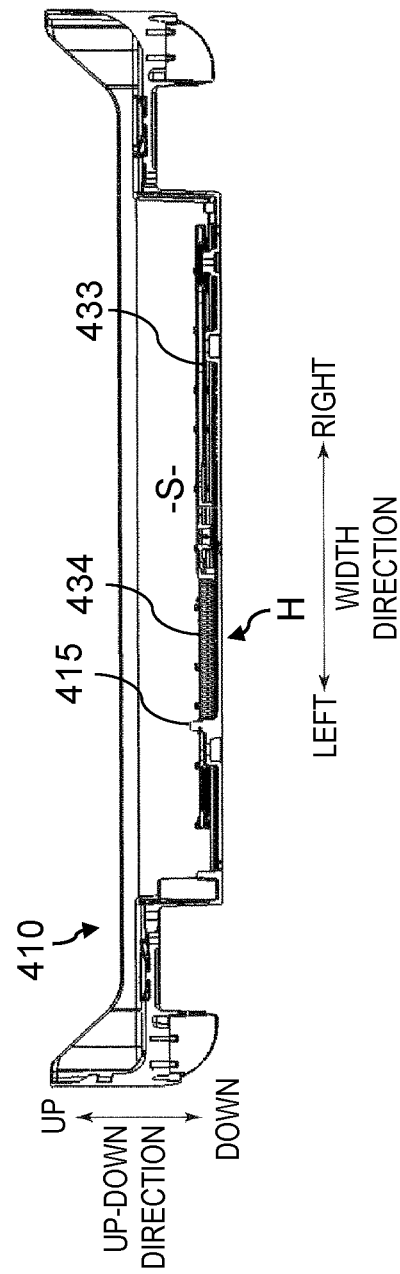

(a)

(b)

ELECTRONIC DEVICE

BACKGROUND

1. Technical Field

The present disclosure relates to an electronic device including a first unit and a second unit to which the first unit is detachably attached. Particularly, the present disclosure relates to a lock mechanism that locks the first unit in the second unit with the first unit attached to the second unit.

2. Description of the Related Art

PTL 1 discloses an electronic device configured such that a first housing having a display is detachable from a second housing having a keyboard.

Here, PTL 1 is Unexamined Japanese Patent Publication No. 2014-236009.

SUMMARY

In the electronic device according to PTL 1, when the first housing is detached from the second housing, it is necessary to detach the first housing with one hand while sliding an operation part with the other hand. In other words, it is necessary to use both hands simultaneously to detach the first housing.

The present disclosure provides an electronic device that enables detachment of a unit without using both hands simultaneously.

An electronic device of the present disclosure includes a first unit having a first electronic component and a second unit having a second electronic component, the first unit being detachably attached to the second unit.

The first unit has an engaging target part.

The second unit has a lock mechanism that locks the first unit in a state attached to the second unit.

The lock mechanism includes an operation member movable between a first position and a second position, an engagement part engageable with the engaging target part, and a drive mechanism that drives the engagement part.

The drive mechanism includes: a moving member provided movable between a first moving position and a second moving position in a moving direction of the operation member and relatively movable to the operation member, the moving member causing the engagement part to be engaged with the engaging target part when the moving member is located at the first moving position, the moving member causing the engagement part to be disengaged from the engaging target part when the moving member is located at the second moving position; a first urging member that urges the operation member to move to the first position; and a second urging member that urges the moving member to move to the first moving position.

The moving member is configured to move to the second moving position against urging of the second urging member when the operation member is moved from the first position to the second position.

The lock mechanism further has a holding mechanism that holds the moving member at the second moving position when the operation member is moved from the first position to the second position, and that releases movement regulation of the moving member held at the second moving position when the first unit is attached to the second unit.

According to the technique of the present disclosure, when the operation member is moved to the second position, the moving member is held at the second moving position. In other words, the engagement part and the engaging target part are held in a disengaged state. As a result, it is possible to remove the unit without using both hands simultaneously.

BRIEF DESCRIPTION OF DRAWINGS

FIG. 4A is a perspective view of a rear side of the tablet unit.

FIG. 5A is a perspective view of a holder and illustrates a state in which engagement members are located at first rotational positions.

FIG. 6B is an enlarged perspective view of the engagement member when the engagement member is located at the second rotational position.

FIG. 8A is a perspective view illustrating main components of the lock mechanism of the holder (when the engagement members are located at the second rotational positions).

FIG. 13C is a sectional view of the holder along the longitudinal direction and only illustrates a cross section of a case, a coupling member, and a spring.

DETAILED DESCRIPTION

Exemplary embodiments will be described in detail below with reference to the accompanying drawings as appropriate. Detailed descriptions more than necessary may be omitted. For example, a detailed description of a well-known matter and a duplicated description of substantially the same configuration will be omitted in some cases. This is to avoid unnecessary redundancy of the following description and to facilitate understanding by those skilled in the art.

Note that the present inventor will provide the accompanying drawings and the following description for those skilled in the art to sufficiently understand the present disclosure, and thus does not intend to limit the subject matter described in the claims First Exemplary Embodiment A first exemplary embodiment will be described below with reference to the drawings.
[1. Configuration]
[1-1. Outline]

Figure 1:
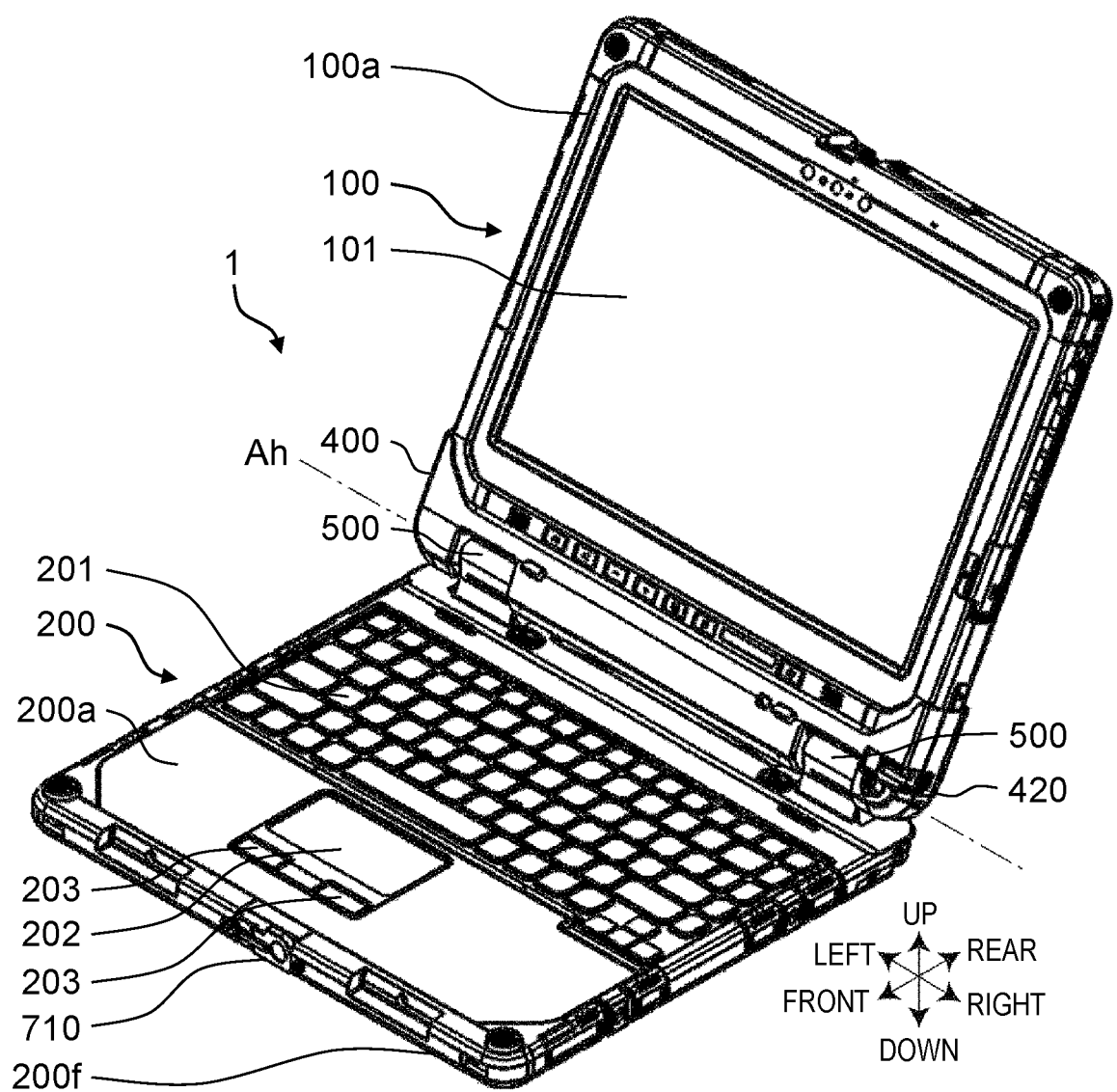
FIG. 1 is a perspective view of a computer according to a first exemplary embodiment and illustrates a state in which a tablet unit is opened.
Figure 2:
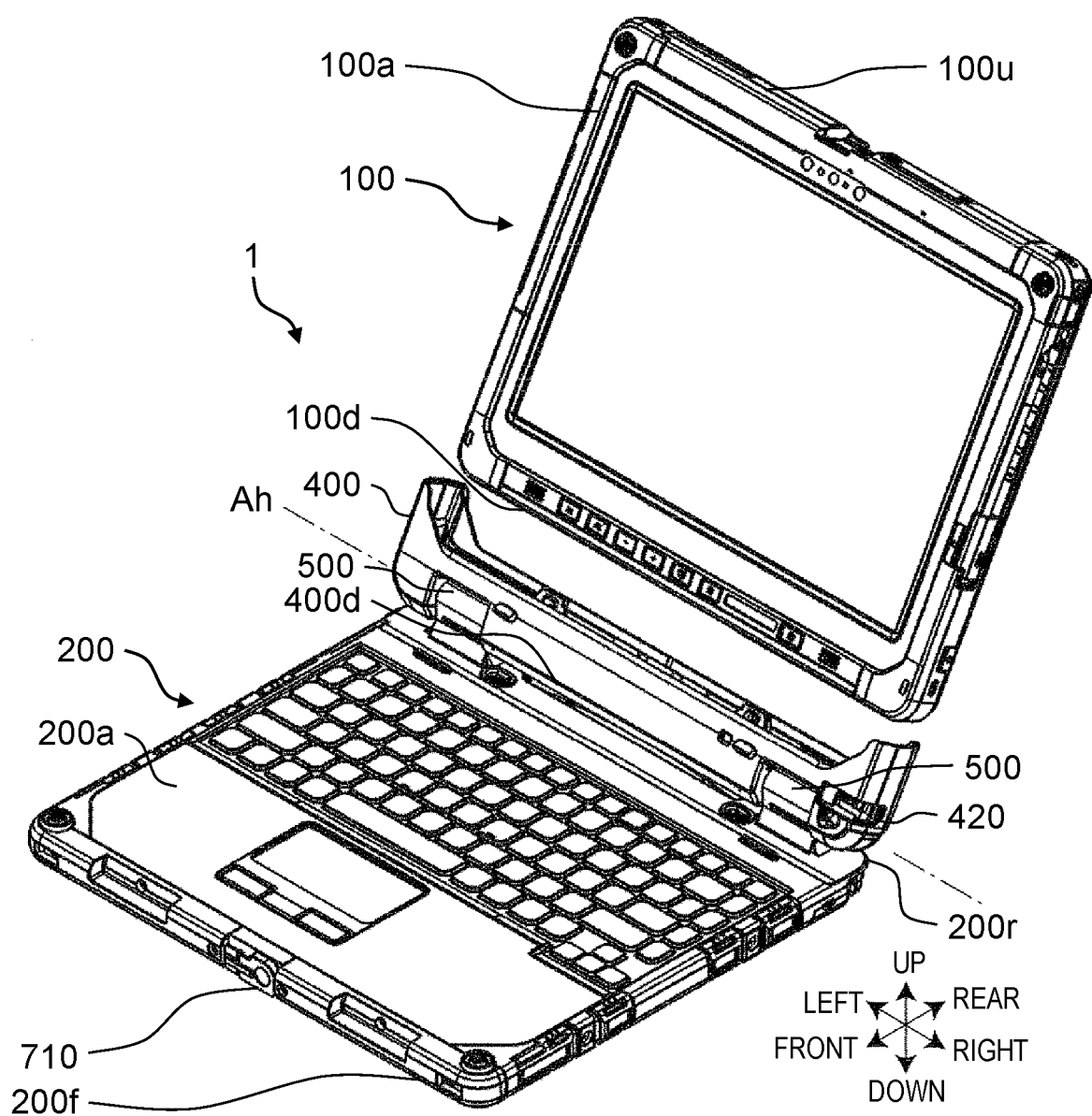
FIG. 2 is a perspective view of the computer and illustrates a state in which the tablet unit is detached.
Figure 3:
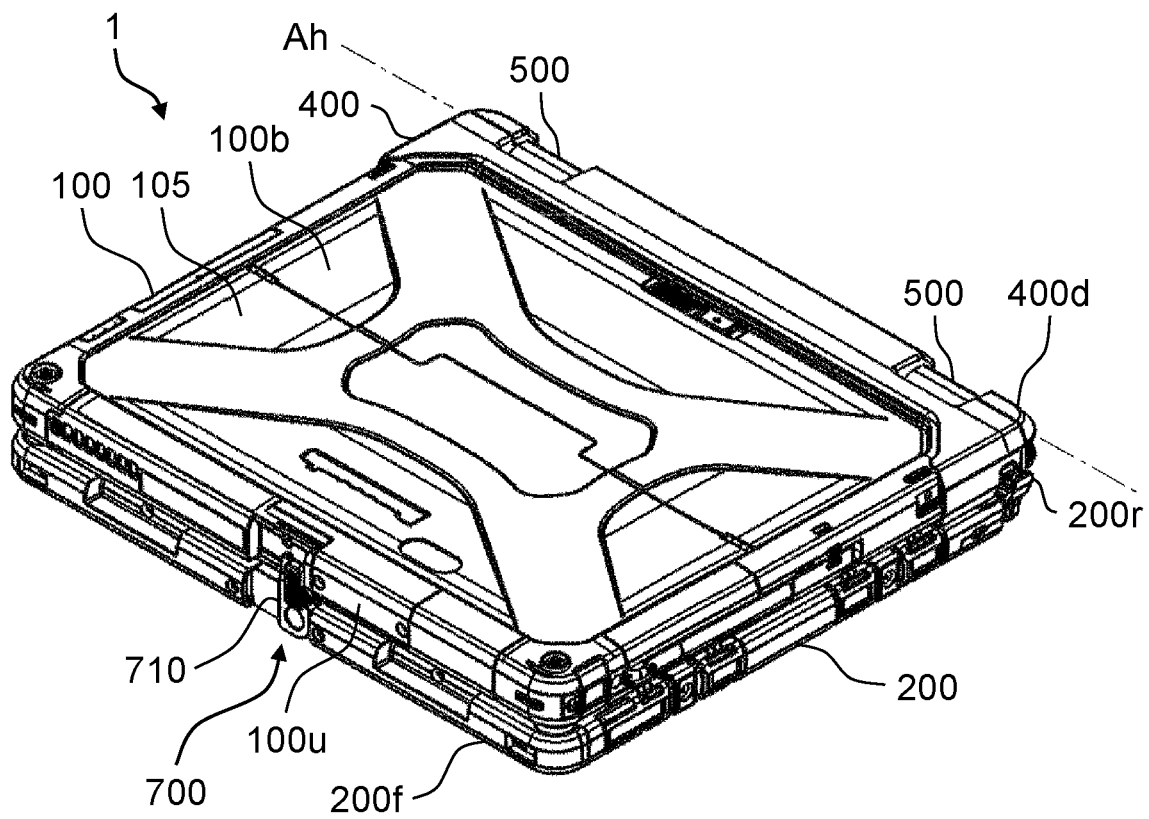
FIG. 3 is a perspective view of the computer and illustrates a state in which the tablet unit is closed.

FIGS. 1, 2, and 3 are perspective views of a computer according to the first exemplary embodiment. FIG. 1 illustrates a state in which tablet unit 100 is attached to keyboard unit 200. FIG. 2 illustrates a state in which tablet unit 100 is detached from keyboard unit 200. FIG. 3 illustrates a state in which tablet unit 100 is closed. In the drawings, directions are given as appropriate for convenience for the purpose of explanation and easier understanding. The directions are based on directions viewed by a user when computer 1 is utilized in a general utilization mode, but it is not intended that computer 1 should be used and disposed in these directions. In FIGS. 1 and 2, a left-right direction corresponds to a width direction of tablet unit 100 and keyboard unit 200. Further, an up-down direction substantially corresponds to a depth direction of tablet unit 100 and corresponds to a thickness direction of keyboard unit 200. Further, a front-rear direction substantially corresponds to a thickness direction of tablet unit 100 and corresponds to a depth direction of keyboard unit 200.

Computer 1 has tablet unit 100 and keyboard unit 200. Computer 1 is an example of an electronic device. Tablet unit 100 is an example of a first unit. Keyboard unit 200 is an example of a second unit.

Tablet unit 100 includes display 101 on front surface 100a (a first principal surface). Display 101 is composed of, for example, a liquid crystal display panel. Further, display 101 has a touch panel capable of receiving touch operation by a user. Various electronic components such as a central processing unit (CPU), a volatile storage device (RAM), a non-volatile storage device (e.g., ROM and SSD), and a communication module are contained in tablet unit 100. These electronic components are examples of first electronic components. Furthermore, a detachable battery that supplies electric power to these electronic components is contained in tablet unit 100. Openable cover 105 is provided on rear surface 100b of tablet unit 100 (see FIG. 3), and the battery can be detached by opening cover 105. In the nonvolatile storage device (such as the ROM and the SSD), an operating system (OS), various application programs, various data, and the like are stored. The central processing unit (CPU) reads the OS, the application programs, and the various data and performs arithmetic processing to achieve various functions in computer 1.

A housing of tablet unit 100 is made of, for example, resin or metal such as a magnesium alloy.

Holder 400 is coupled to keyboard unit 200 via hinge 500.

Keyboard unit 200 includes keyboard 201, touch pad 202, operation buttons 203, and the like on upper surface 200a (second principal surface). Further, keyboard unit 200 has an interface for transmitting and receiving data to and from tablet unit 100 and an external device interface for connection with an external device. Various electronic components such as a keyboard controller and a touch pad controller are contained in keyboard unit 200. These electronic components are examples of second electronic components.

A housing of keyboard unit 200 is made of, for example, resin or metal such as a magnesium alloy.

As illustrated in FIG. 2, holder 400 is coupled to side surface 200r on a rear side of keyboard unit 200 (hereinafter referred to as "rear side surface 200r" as appropriate) via hinge 500. As illustrated in FIG. 1, holder 400 can attach tablet unit 100. Further, as illustrated in FIG. 2, holder 400 can detach tablet unit 100 by operating operation member 420.

Hinge 500 couples rear side surface 200r of keyboard unit 200 and side surface 400d on a lower side of holder 400 (hereinafter referred to as "lower side surface 400d" as appropriate). By hinge 500, keyboard unit 200 and holder 400 are relatively rotatable around rotation axis Ah parallel to a width direction (left-right direction in FIG. 1) of computer 1. Note that this also means that hinge 500 couples rear side surface 200r of keyboard unit 200 and side surface 100d on a lower side of tablet unit 100 attached to holder 400 (hereinafter referred to as "lower side surface 100d" as appropriate). By hinge 500, keyboard unit 200 and tablet unit 100 are relatively rotatable around rotation axis Ah parallel to the width direction of computer 1. For example, as illustrated in FIG. 1, hinge 500 can allow tablet unit 100 to be opened at an angle of about 100 degrees with respect to keyboard unit 200. Also, as illustrated in FIG. 3, hinge 500 can allow tablet unit 100 to be closed with respect to keyboard unit 200. In the closed state, front surface 100a of tablet unit 100 and upper surface 200a of keyboard unit 200 closely face each other and are substantially parallel to each other.

Holder 400 is provided with connector 460 (see FIG. 5A) that is connected with connector 140 (see FIG. 4A) of tablet unit 100 with tablet unit 100 attached to holder 400. Various signals and electric power are given and received between tablet unit 100 and keyboard unit 200 via these connectors 140, 460. For example, signals output from keyboard 201, touch pad 202, the plurality of operation buttons 203, and the like, of keyboard unit 200 can be output to tablet unit 100. Tablet unit 100 can receive these signals and perform control based on the received signals. Therefore, computer 1 can be utilized as a notebook type computer by attaching tablet unit 100 to keyboard unit 200. Further, tablet unit 100 can be utilized alone as a tablet type computer.

Additionally, computer 1 is provided with latch mechanism 700 that locks tablet unit 100 in keyboard unit 200 with tablet unit 100 closed by facing keyboard unit 200. Latch mechanism 700 is configured such that upper side surface 100*u* of tablet unit 100 and front side surface 200*f* of keyboard unit 200 are locked by latch 710.

[1-2. Lock Mechanism]

Computer 1 of the present exemplary embodiment includes a lock mechanism that locks tablet unit 100 attached to holder 400 in an attached state. The lock mechanism will be described below in detail.

[1-2-1. Tablet Unit Side]

FIG. 4A is a perspective view of a rear side of tablet unit 100. Engaging target parts 130 are provided on lower side surface 100*d* of tablet unit 100. Engaging target parts 130 are capable of engaging with engagement members 443 (see FIG. 5A) of engagement parts 440 configuring the lock mechanism of holder 400. Two engaging target parts 130 are provided on lower side surface 100*d* spaced apart from each other in the width direction of tablet unit 100.

Figure 4B:
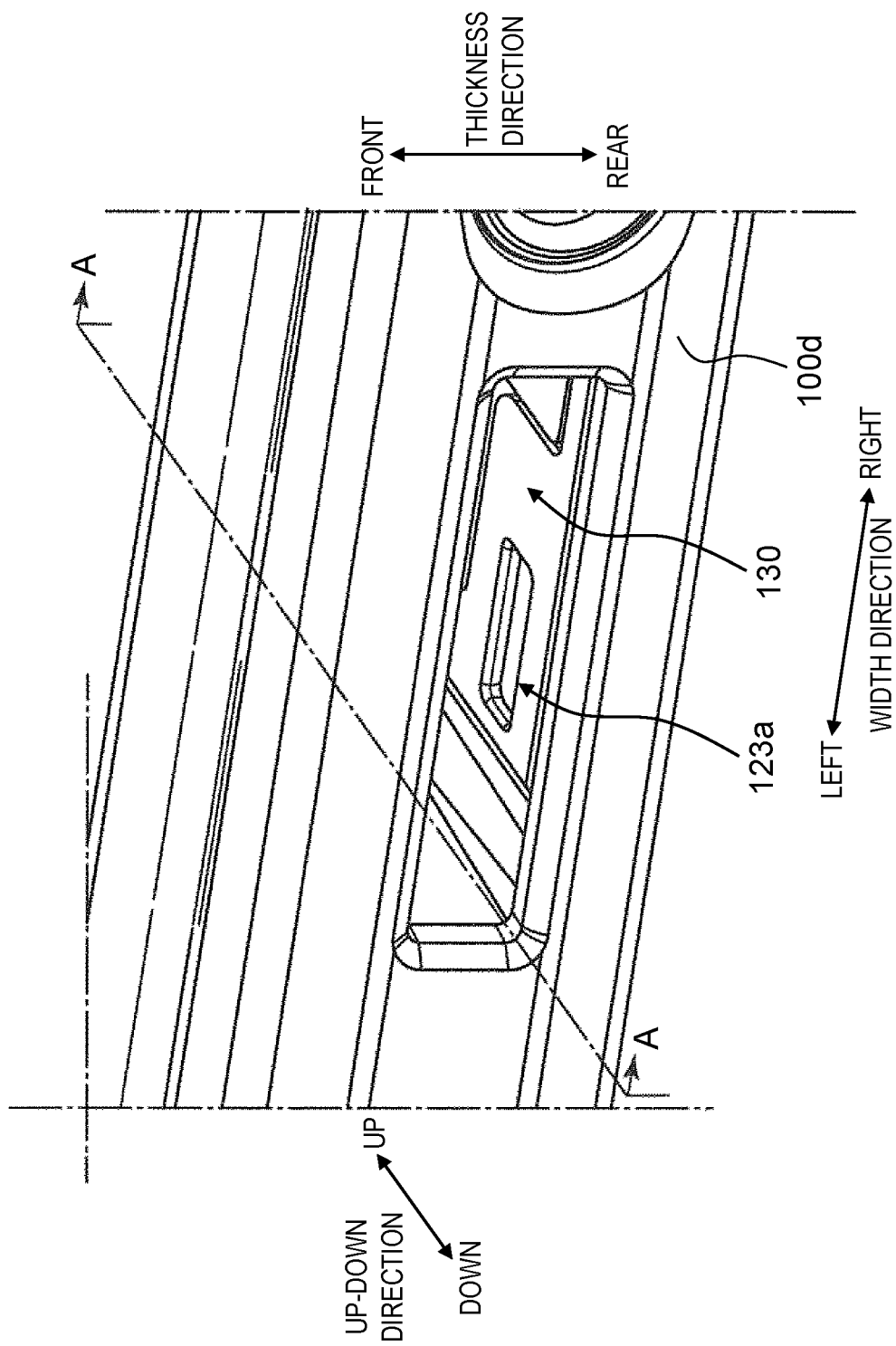
FIG. 4B is an enlarged perspective view of an engaging target part of the tablet unit.
Figure 4C:
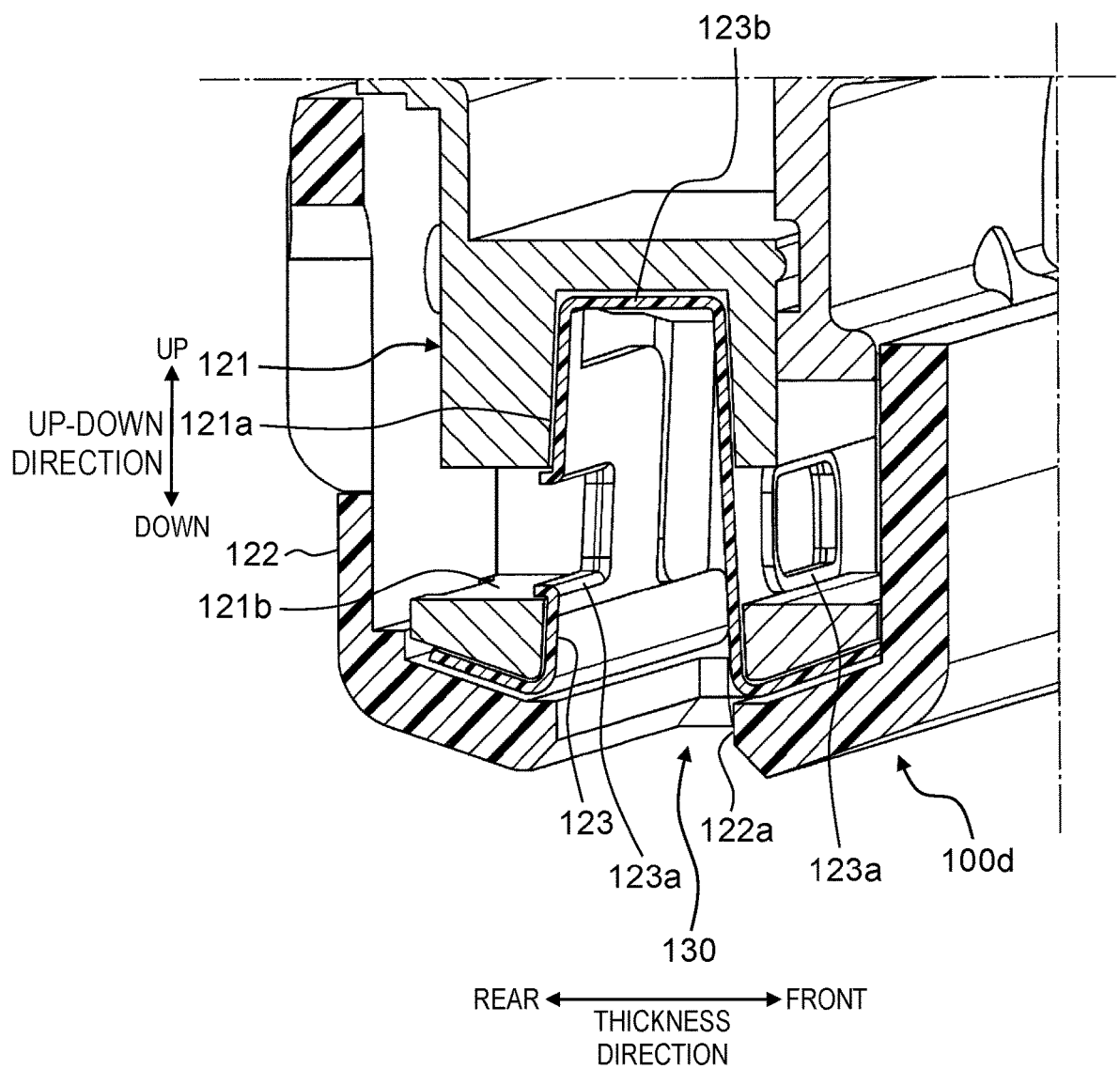
FIG. 4C is a sectional view taken along line A-A in FIG. 4B.

FIG. 4B is an enlarged perspective view of engaging target part 130 of tablet unit 100 according to the present exemplary embodiment. FIG. 4C is a sectional view taken along line A-A of FIG. 4B. As illustrated in these drawings, engaging target part 130 is formed as a recess that can engage with engagement member 443, which is described later. Tablet unit 100 includes frame 121 that is made of metal and side cover 122 that is made of resin. Frame 121 is a member that forms a framework and a part of an exterior of tablet unit 100. Side cover 122 is a frame-shaped member that covers an exterior of lower side surface 100*d* of tablet unit 100. Recess 121*a* is formed in frame 121. Opening 122*a* is formed in side cover 122. Recess 121*a* of frame 121 is mounted with, at an inner surface, protection member 123 that is made of metal. Protection member 123 is provided with a pair of engagement holes 123*a* that can respectively engage with a pair of engagement projections 443*a* (to be described later) (see FIG. 5B) of engagement member 443. Frame 121 is further provided with, at recess 121*a*, a pair of engagement recesses 121*b* that can respectively engage with the pair of engagement projections 443*a* of engagement member 443. Note that protection member 123 is preferably made of stainless steel material instead of a magnesium alloy for wear prevention.

[1-2-2. Holder Side]

Figure 5B:
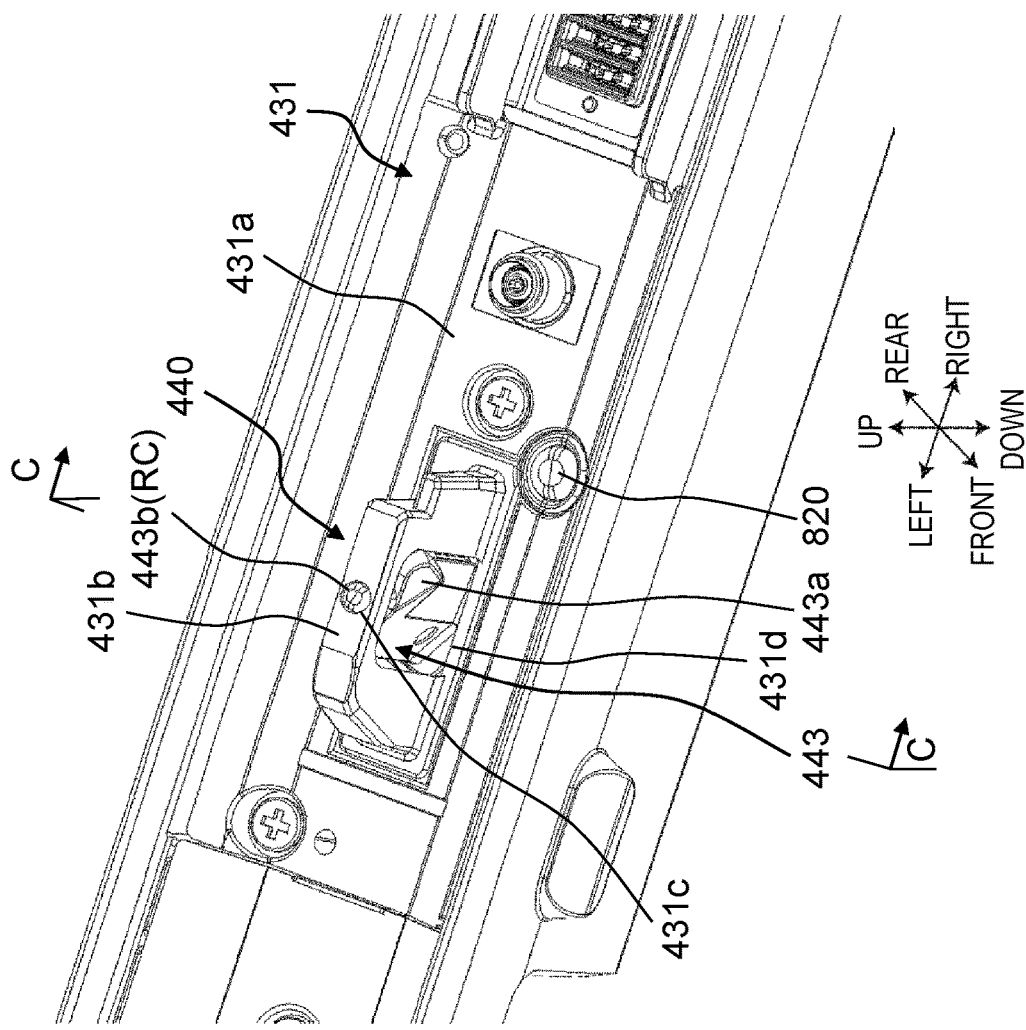
FIG. 5B is an enlarged perspective view of the engagement member when the engagement member is located at the first rotational position.
Figure 6A:
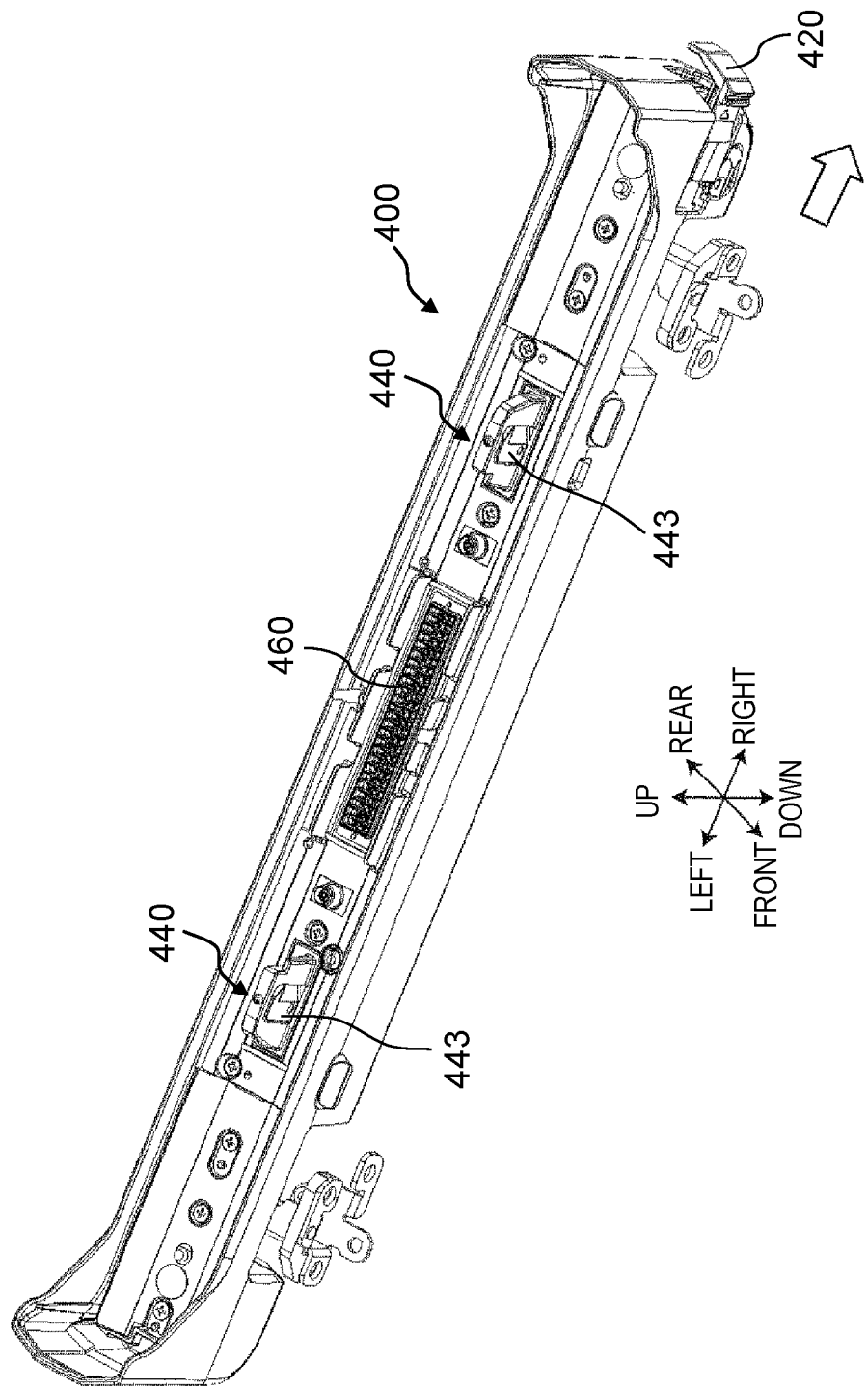
FIG. 6A is a perspective view of the holder and illustrates a state in which the engagement members are located at second rotational positions.

FIGS. 5A and 6A are perspective views of holder 400. FIG. 5A illustrates a state in which engagement members 443 are located at first rotational positions (engagement positions). FIG. 6A illustrates a state in which engagement members 443 are located at second rotational positions (disengagement positions). FIG. 5B is an enlarged perspective view of engagement member 443 when engagement member 443 is located at the first rotational position. FIG. 6B is an enlarged perspective view of engagement member 443 when engagement member 443 is located at the second rotational position.

Figure 7:
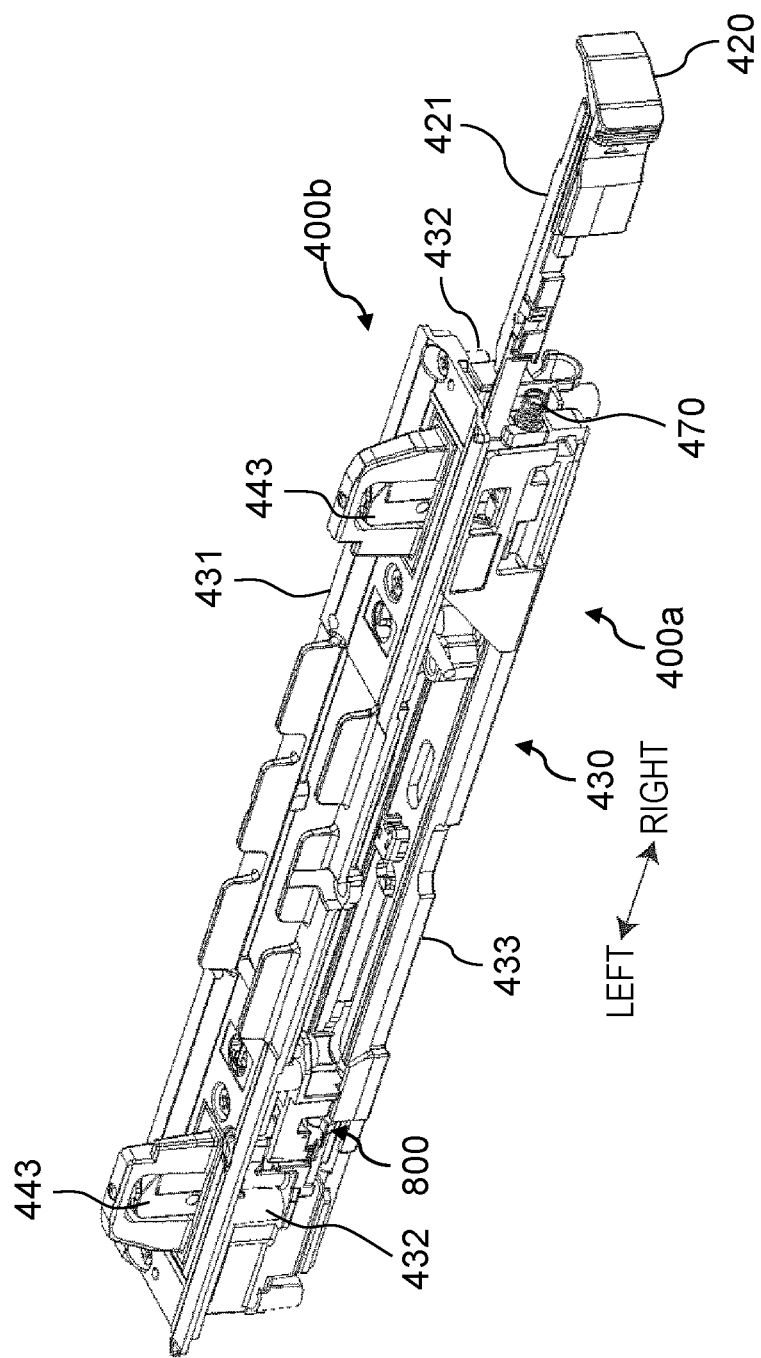
FIG. 7 is a perspective view illustrating a lock mechanism of the holder by omitting some parts (when the engagement members are located at the second rotational positions).

Holder 400 includes case 410, operation member 420, engagement parts 440, and drive mechanism 430 (see FIG. 7).

As illustrated in FIG. 5A, holder 400 has a boat shape extending in the width direction of computer 1 and includes recess 400*y* into which lower side surface 100*d* of tablet unit 100 can be fit.

Engagement parts 440 are formed to be engageable with engaging target parts 130 of tablet unit 100. Engagement parts 440 each have engagement members 443. As will be detailed later, engagement members 443 are each formed to be rotatable about rotation axis RC (an axis of rotation shaft 443*b*) that is parallel to a up-down direction of holder 400. Two engagement members 443 are each provided on an upper surface of base 431*a* of support member 431 and are spaced apart from each other along a longitudinal direction (width direction) of holder 400. Two engagement members 443 are each disposed to have a positional relationship engageable with engaging target part 130 of tablet unit 100 when lower side surface 100*d* of tablet unit 100 is fitted into holder 400. Engagement members 443 are each disposed to project upward beyond the upper surface of base 431*a* of support member 431.

Engagement members 443 located at the first rotational positions engage with engaging target parts 130. The first rotational position is a rotational position where engagement projections 443*a* of engagement member 443 protrude to a front side and a rear side from a front surface and a rear surface of engagement member support 431*b* of support member 431, respectively. Further, engagement members 443 rotated to the second rotational positions are disengaged from engaging target parts 130. The second rotational position is a rotational position where engagement projections 443*a* of engagement member 443 do not protrude to the front side and the rear side from the front surface and the rear surface of engagement member support 431*b* of support member 431, respectively. Operation of operation member 420 is transmitted to engagement members 443 via drive mechanism 430. When operation member 420 is moved from a first position illustrated in FIG. 5A to a second position illustrated in FIG. 6A, engagement members 443 rotate from the first rotational positions to the second rotational positions.

Figure 6C:
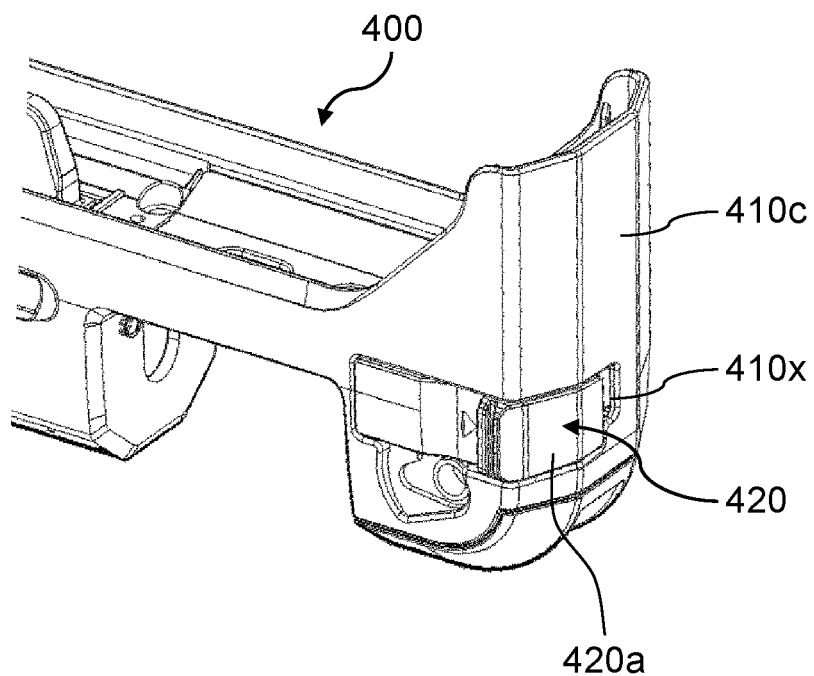
FIG. 6C is an enlarged perspective view of a right end in a longitudinal direction of the holder.

FIG. 6C is an enlarged perspective view of a right end in the longitudinal direction of holder 400. Operation member 420 is disposed at right end 410*c* in the longitudinal direction of holder 400 and moves parallel to the longitudinal direction of holder 400. The first position is a position where operation member 420 is substantially flush with an exterior of end 410*c* of holder 400. The second position is a position where operation member 420 is further apart from the exterior of end 410*c* of holder 400 in the longitudinal direction than the first position.

At end 410*c* of holder 400 (case 410), insertion hole 410*x* capable of inserting an insertion member of a so-called Kensington lock is provided adjacent to operation member 420. Accordingly, when the insertion member of the Kensington lock is inserted into insertion hole 410*x*, a body of the Kensington lock can be approached to (or abutted on) end 410*c* and operation member 420 of holder 400. As a result, when the Kensington lock is fastened, it is impossible to move operation member 420 to the second position.

[1-2-3. Drive Mechanism]

When operation member 420 is moved from the first position shown in FIG. 5A to the second position shown in FIG. 6A, drive mechanism 430 causes engagement members 443 to rotate from the first rotational positions (engagement positions) to the second rotational positions (disengagement positions). Further, when tablet unit 100 is attached to holder 400, drive mechanism 430 rotates engagement members 443 to the first rotational positions (engagement positions).

FIG. 7 is a perspective view illustrating the lock mechanism of holder 400 by omitting some parts (when engagement members 443 are located at the second rotational positions).

Drive mechanism 430 includes connecting member 421, support members 431, base members 432, coupling member 433, first spring 434 (see FIG. 13C), second spring 451 (see FIG. 13B), third spring 470, holding mechanism 800, and the like.

Figure 8B:
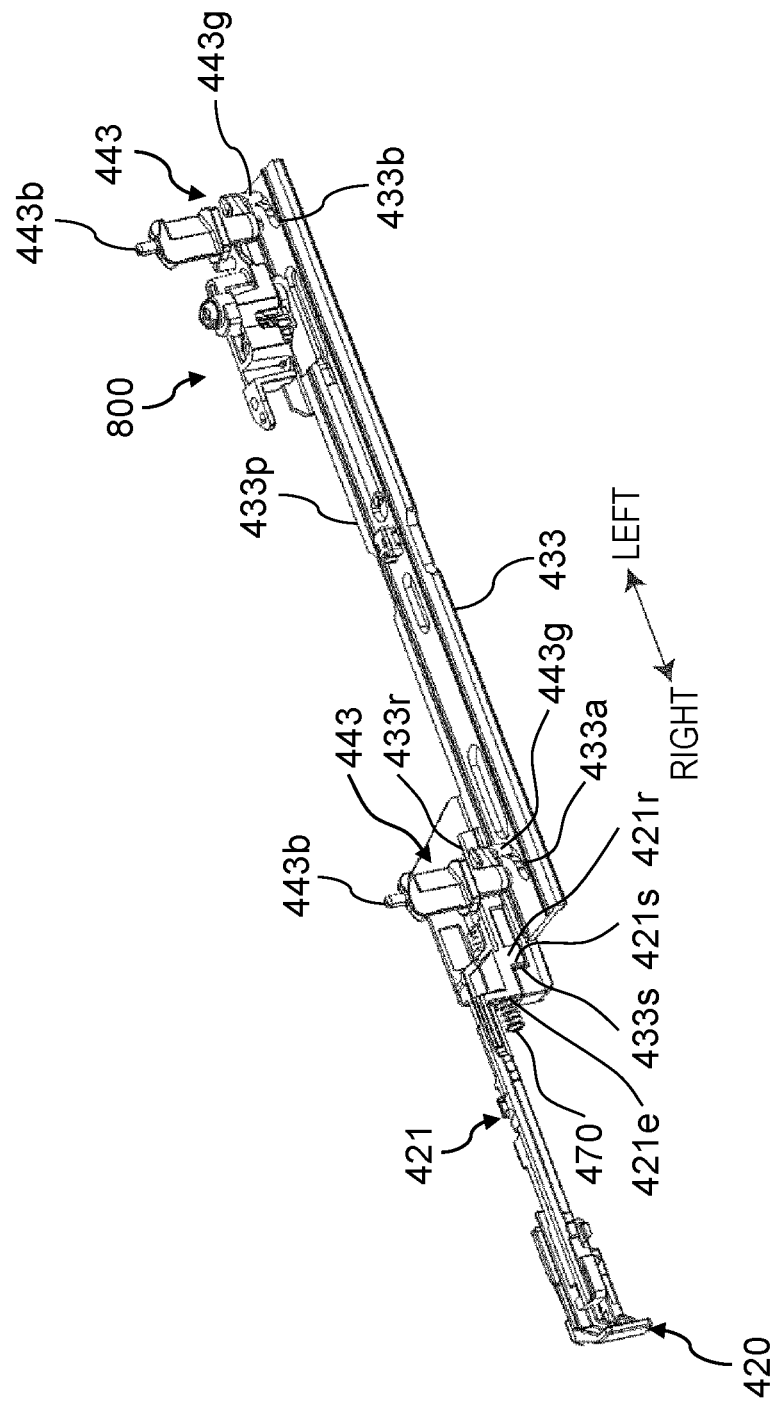
FIG. 8B is a perspective view illustrating the main components of the lock mechanism of the holder (when the engagement members are located at the second rotational positions).
Figure 9A:
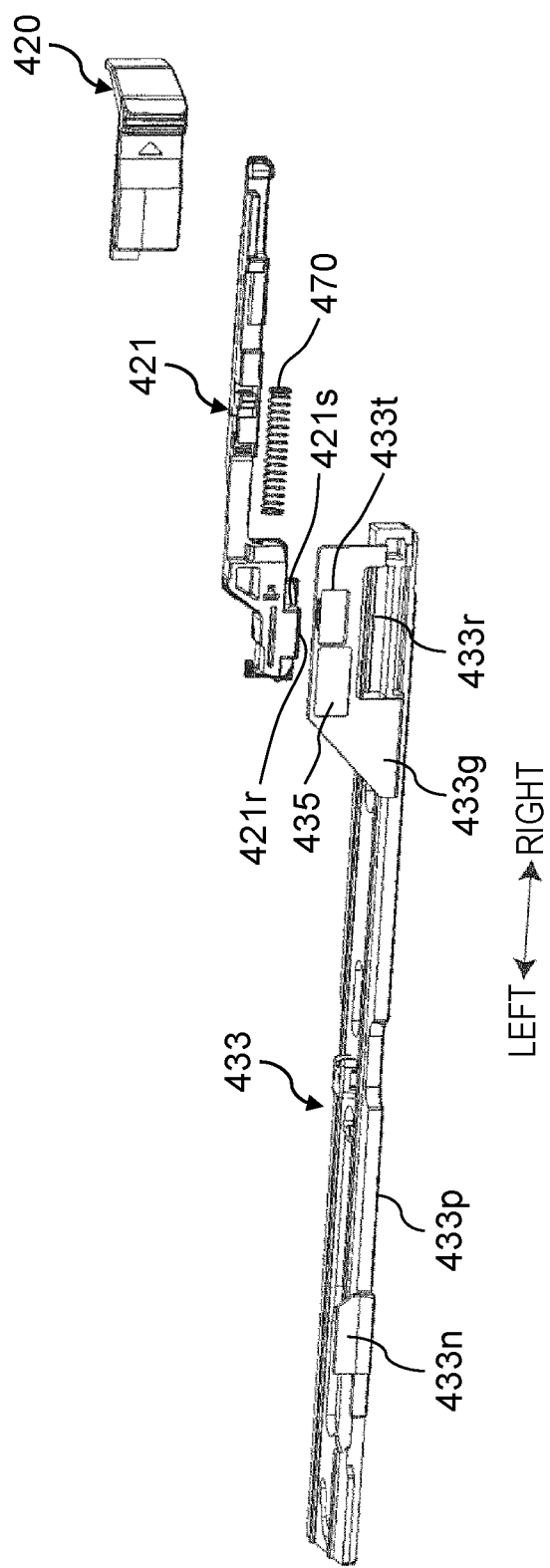
FIG. 9A is an exploded perspective view of the main components of the lock mechanism of the holder.
Figure 9B:
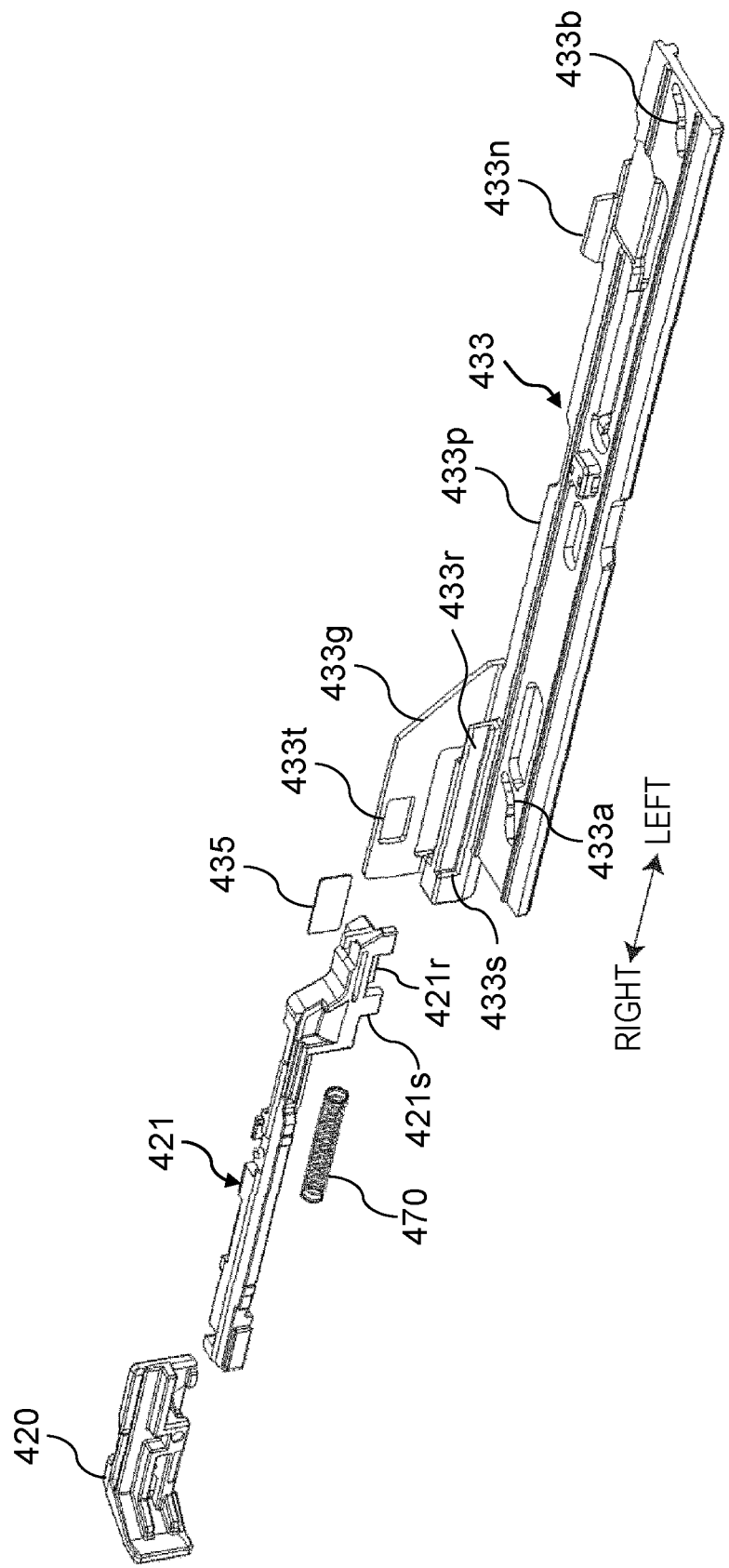
FIG. 9B is an exploded perspective view of the main components of the lock mechanism of the holder.

FIGS. 8A and 8B are perspective views illustrating main components of the lock mechanism of holder 400. FIG. 8A is a perspective view of the main components viewed from a side of holder 400 near front surface 400a, and FIG. 8B is a perspective view of the main components viewed from a side of holder 400 near rear surface 400b. FIGS. 8A and 8B illustrate the main components when engagement members 443 are located at the second rotational positions. FIGS. 9A and 9B are exploded perspective views of the main components of the lock mechanism of holder 400. FIG. 9A is a perspective view of the main components viewed from a side of holder 400 near front surface 400a, and FIG. 9B is a perspective view of the main components viewed from a side of holder 400 near rear surface 400b.

Connecting member 421 is a bar-shaped member extending along the width direction of holder 400. Connecting member 421 is fixed to operation member 420 at one end. Connecting member 421 is mounted to coupling member 433 at the other end so as to be relatively movable in a longitudinal direction (the width direction of holder 400).

Coupling member 433 is a plate-shaped member that extends along the width direction of holder 400, and is mounted to operation member 420 via connecting member 421. Coupling member 433 is relatively movable to operation member 420. Coupling member 433 is supported by case 410 so as to be movable between a first moving position and a second moving position along a moving direction of operation member 420 (the width direction of holder 400). The first moving position is a position where engagement parts 440 are located at the engagement positions. The second moving position is a position where engagement parts 440 are located at the disengagement positions. In the present exemplary embodiment, "engagement parts 440 are located at the engagement positions" means that engagement members 443 are located at the first rotational positions, for example. "Engagement parts 440 are located at the disengagement positions" means that engagement members 443 are located at the second rotational positions, for example.

Coupling member 433 is made of, for example, resin. Note that coupling member 433 may be made of metal as long as slidability equivalent to slidability of the resin is ensured.

As illustrated in FIGS. 8B and 9B, grooves 433a, 433b are respectively provided at right and left ends of flat surface 433p of coupling member 433. Engagement shafts 443g of engagement members 443 respectively engage with grooves 433a, 433b for relative movement.

Figure 12:
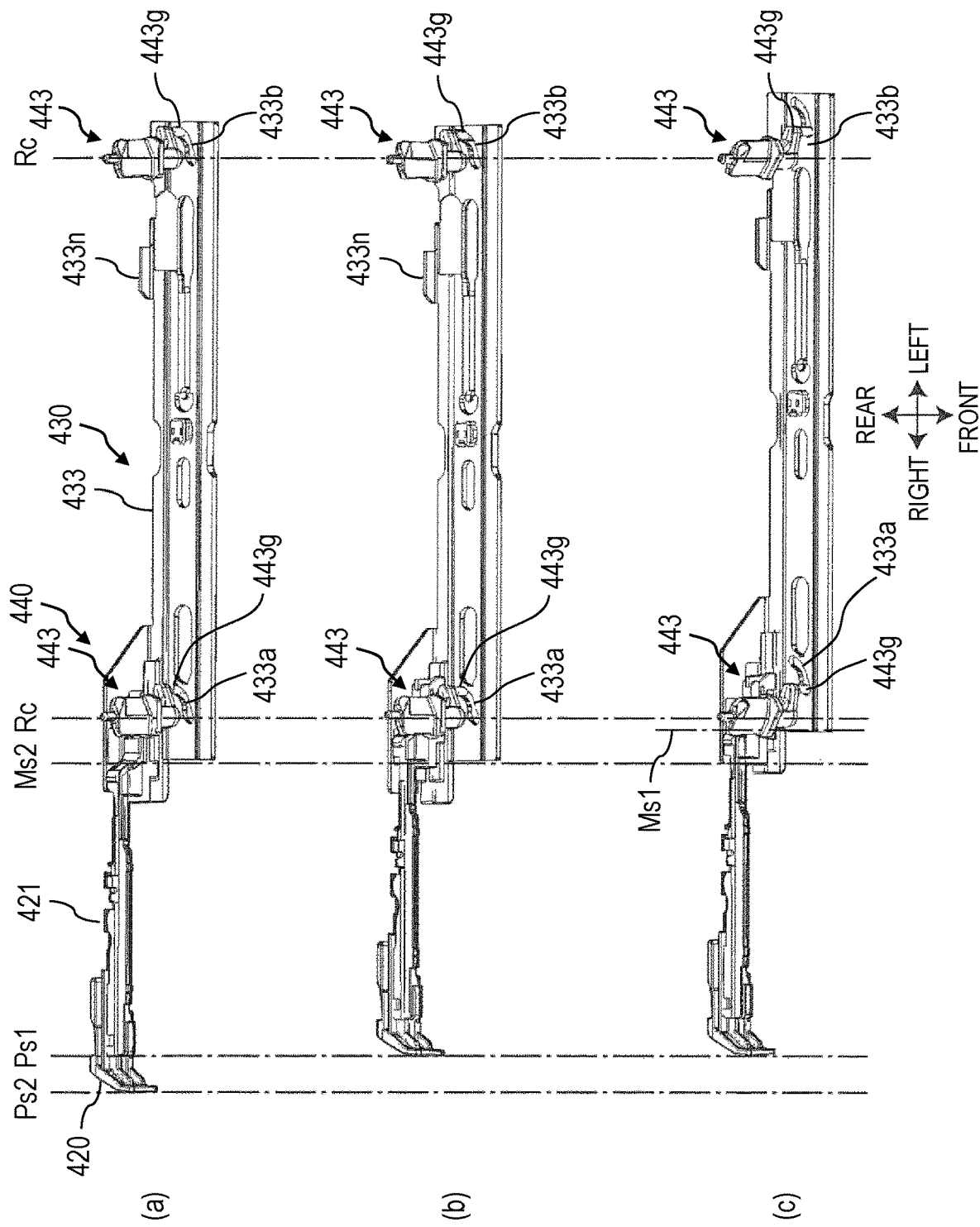
FIG. 12 is an operation description view of the lock mechanism.

When coupling member 433 is moved to first moving position Ms1 as illustrated in part (c) of FIG. 12, grooves 433a, 433b each cause engagement member 443 to rotate around rotation axis RC (the axis of rotation shaft 443b) to the first rotational position. Further, when coupling member 433 is moved to second moving position Ms2 as illustrated in parts (a) and (b) of FIG. 12, grooves 433a, 433b each cause engagement member 443 to rotate around rotation axis RC to the second rotational position. Grooves 433a, 433b are each meandered and formed into a substantially inverted S shape to realize the rotation.

A connection structure of coupling member 433 and connecting member 421 will be described. As illustrated in FIGS. 9A and 9B, perpendicular surface 433g that is perpendicular to flat surface 433p is provided at the right end of coupling member 433. Rail 433r is provided on a side of perpendicular surface 433g along a longitudinal direction of coupling member 433. Further, fitting part 421r is provided at a left end of connecting member 421. Fitting part 421r is slidably fitted along rail 433r of coupling member 433. As a result, connecting member 421, that is, operation member 420 fixed to connecting member 421, is relatively movable to coupling member 433.

Movement regulating wall 433s is provided at a right end of rail 433r of coupling member 433. Further, movement regulating wall 421s is provided at a right end of fitting part 421r of connecting member 421. As illustrated in FIG. 8B, fitting part 421r of connecting member 421 is fitted into rail 433r of coupling member 433. With this configuration, when operation member 420 is moved to the right (second position), movement regulating wall 433s of coupling member 433 and movement regulating wall 421s of connecting member 421 abut against each other to prevent operation member 420 from moving further to the right from the second position.

As illustrated in FIG. 8B, third spring 470 is locked in spring lock 421e of connecting member 421 at one end, and is locked in a spring lock (not illustrated) of case 410 of holder 400 at the other end. Third spring 470 pulls operation member 420 fixed to connecting member 421 toward the first position.

Figure 13A:
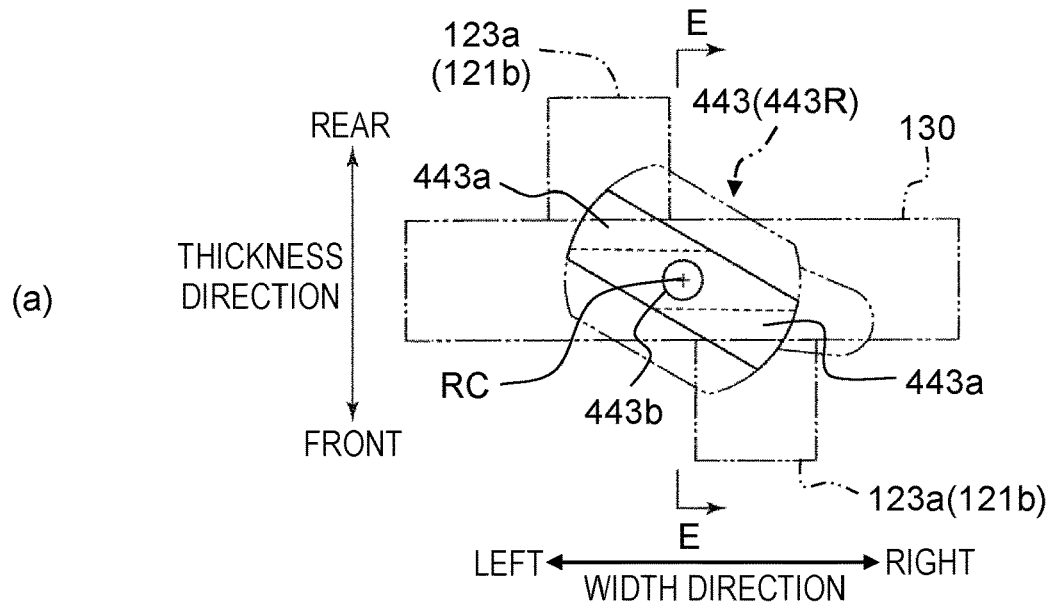
FIG. 13A is a view for explaining an engaged state by the lock mechanism.
Figure 13A:
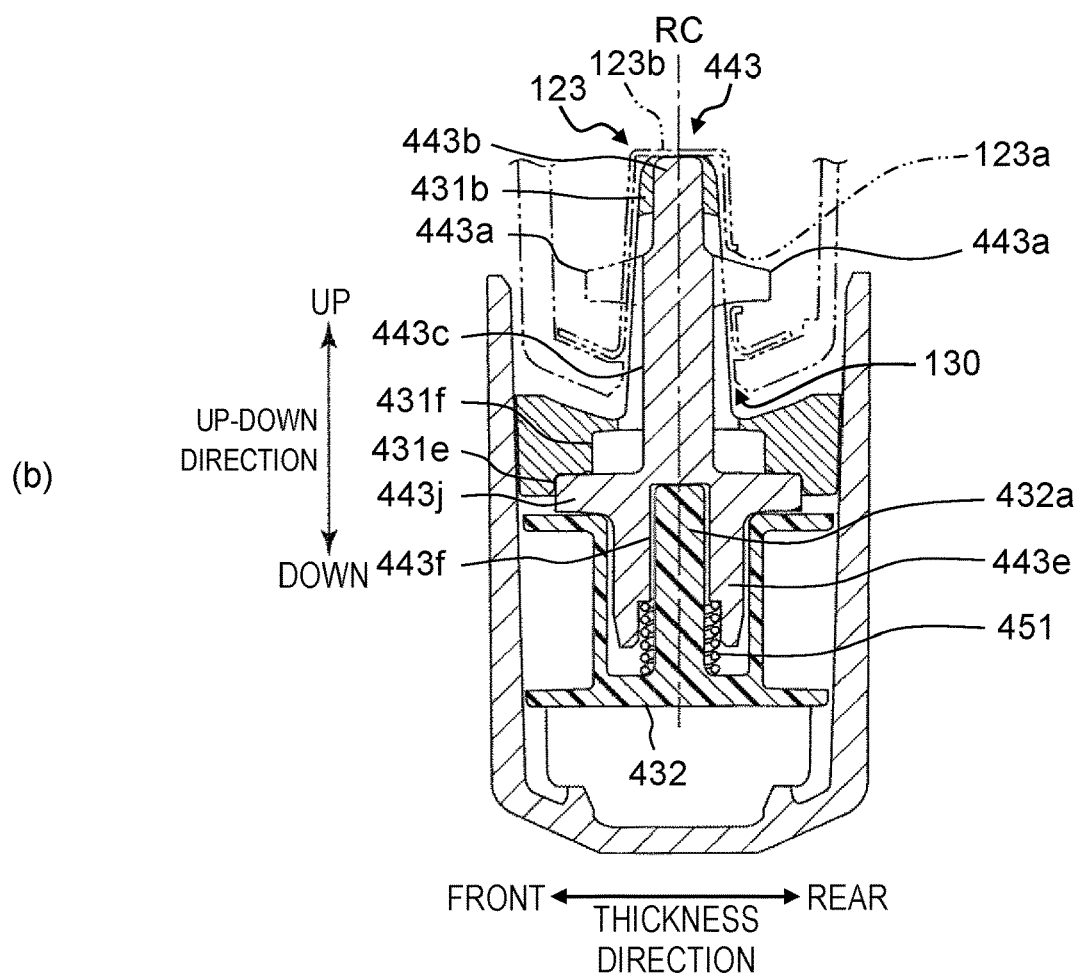

Returning back to FIG. 7, base members 432 are members that extend along the width direction of holder 400 and are fixed to case 410. Base members 432 are made of, for example, resin. As illustrated in FIG. 13A, base members 432 each include rotation center shaft 432a.

Rotation center shaft 432a is inserted into shaft hole 443f formed in a lower part of engagement member 443 and supports the lower part of engagement member 443 so that engagement member 443 is rotatable.

Returning back to FIGS. 5A, 5B, and 7, support members 431 are disposed at a center in the width direction of holder 400. Support members 431 are bar-shaped members extending along the width direction of holder 400. Support members 431 are fixed to case 410. Support members 431 are made of, for example, metal. Support members 431 each include base 431a, engagement member support 431b, and engagement member disposition hole 431d.

Base 431a is mounted to base member 432 and is fixed to base member 432 and case 410 by means of, for example, screws.

In base 431a, engagement member disposition hole 431d is a hole that passes through in the up-down direction of holder 400. An upper part of engagement member 443 is rotatably disposed within engagement member disposition hole 431d. The upper part of engagement member 443 thus projects upward from the upper surface of base 431a.

Engagement member support 431b is erected on base 431a to straddle engagement member disposition hole 431d in the width direction of holder 400. Engagement member support 431b is gate-shaped. Engagement member support 431b has insertion hole 431c that passes through in the up-down direction of holder 400. Rotation shaft 443b of engagement member 443 is passed through insertion hole 431c. In this way, engagement member support 431b supports the upper part of engagement member 443, so that engagement member 443 is rotatable about rotation shaft 443b.

Figure 13B:
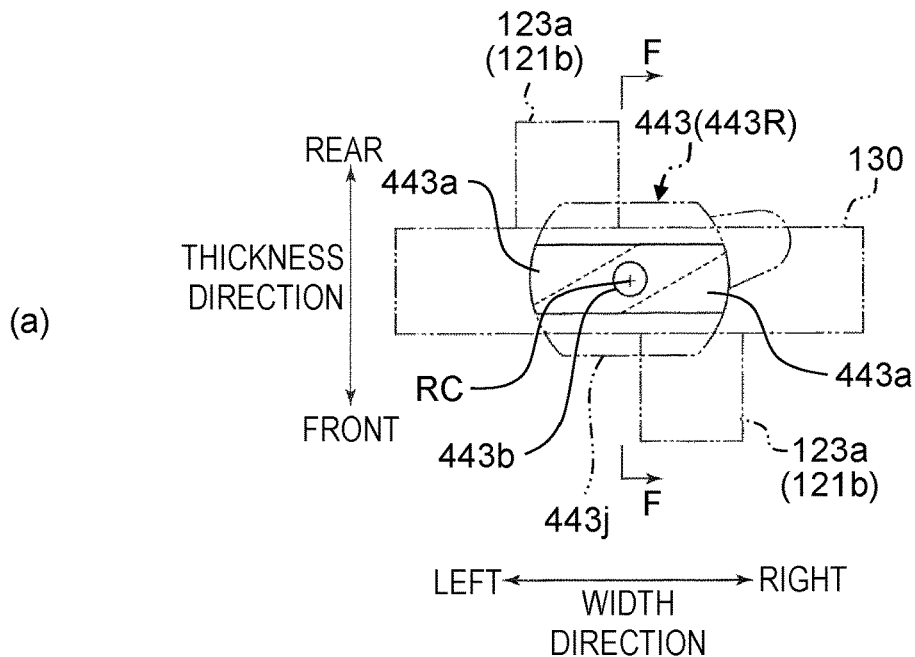
FIG. 13B is a view for explaining a disengaged state by the lock mechanism.
Figure 13B:
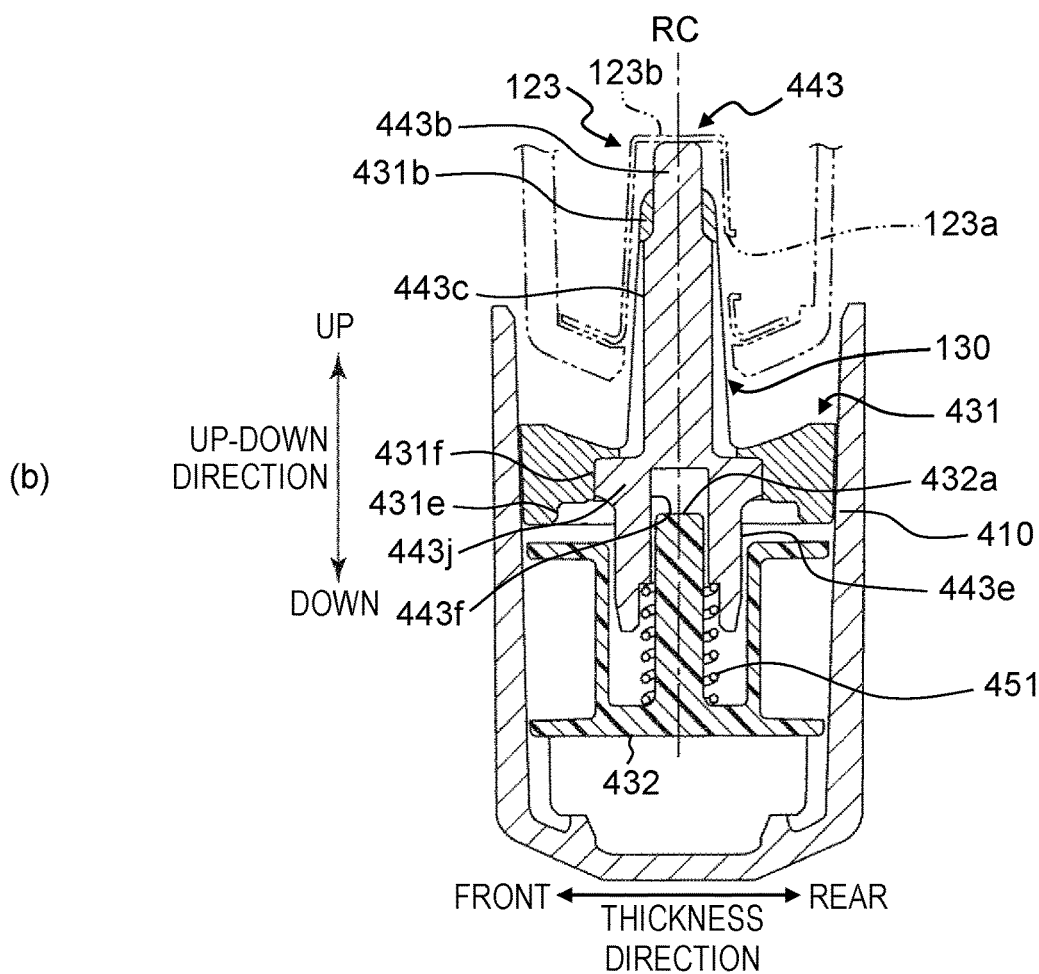
Figure 13D:
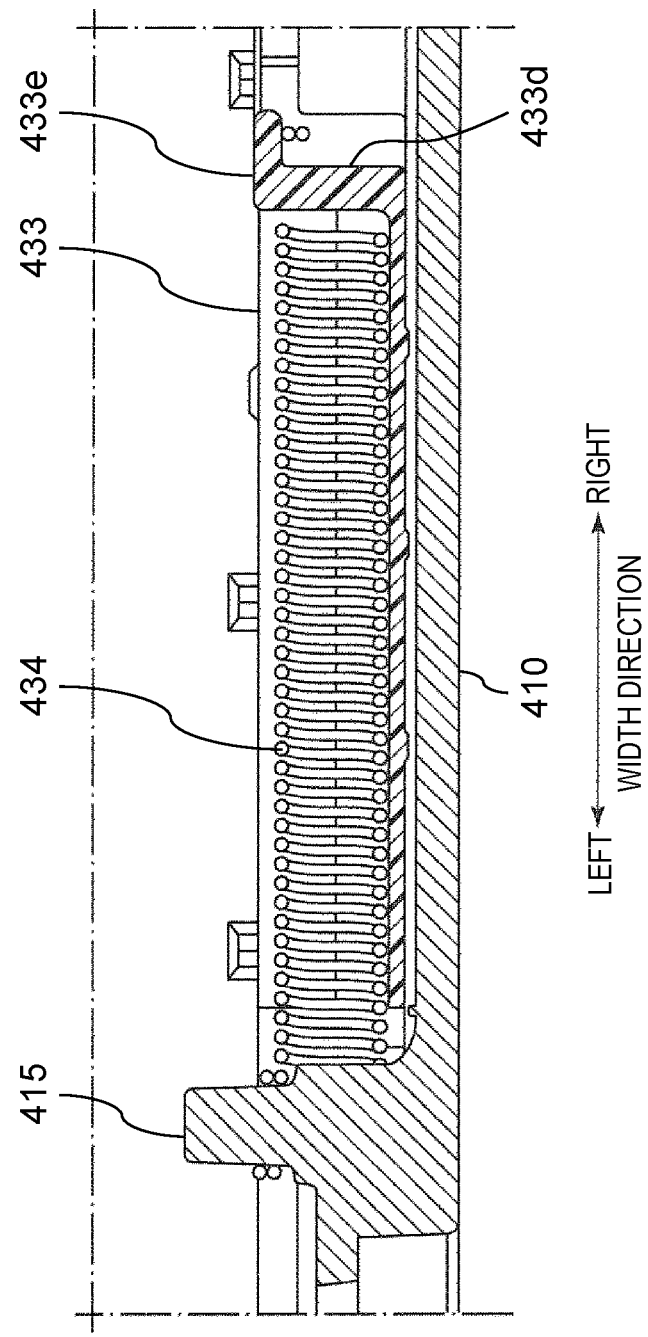
FIG. 13D is an enlarged view of a portion indicated by arrow H of FIG. 13C.

FIG. 13C is a sectional view of holder 400 along the longitudinal direction and only illustrates a cross section of the case, coupling member 433, and the spring. FIG. 13D is an enlarged view of a portion indicated by arrow H of FIG. 13C.

First spring 434 is accommodated in spring housing 433d of coupling member 433. One end of first spring 434 is locked in spring lock 433e of coupling member 433. The other end of first spring 434 is locked in spring lock 415 of case 410. First spring 434 urges coupling member 433 toward the first moving position in the width direction. Details of second spring 451 will be described later.

[1-2-4. Engagement Member]

Figure 10A:
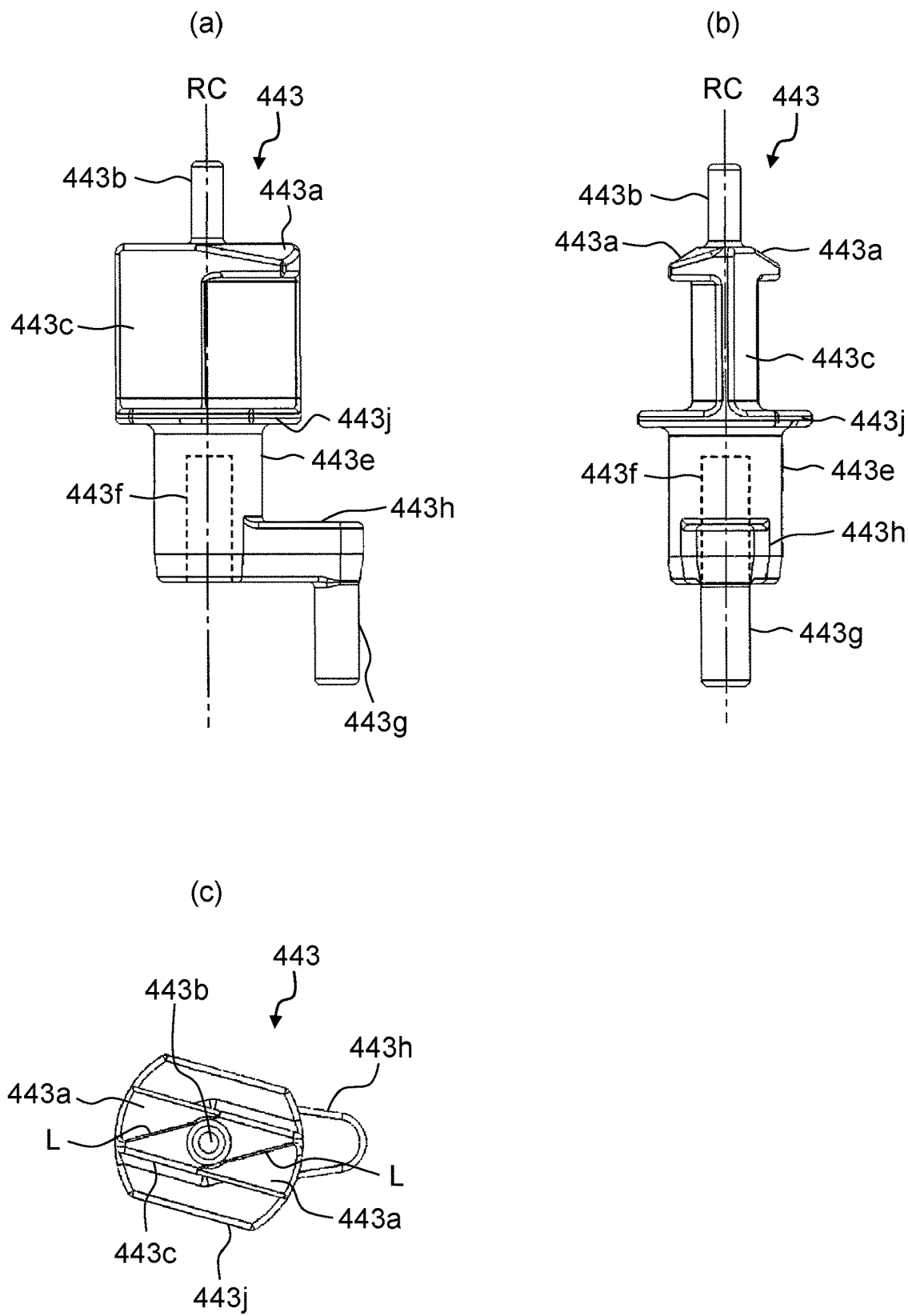
FIG. 10A is an external view of the engagement member.

FIG. 10A is an external view of engagement member 443 that configures the lock mechanism. Specifically, part (a) of FIG. 10A is a front view, part (b) of FIG. 10A is a side view, and part (c) of FIG. 10A is a plan view.

As shown in parts (a), (b), and (c) of FIG. 10A, engagement member 443 includes above-mentioned rotation shaft 443b, engagement body 443c, cylinder 443e, arm 443h, engagement shaft 443g, and fitting protrusion 443j.

Rotation shaft 443b is provided at an upper end of engagement member 443.

Engagement body 443c includes the pair of engagement projections 443a that is formed to project in radially opposite directions with rotation shaft 443b between engagement projections 443a. Engagement projections 443a are formed by cutting off parallel side parts of a cylinder with rotation shaft 443b (rotation axis RC) between the parallel side parts and then shaving off, except for a part near an upper surface of the cylinder, radially outer parts with respect to respective lines indicated by L.

Cylinder 443e has shaft hole 443f that opens toward a lower end of cylinder 443e. Shaft hole 443f is formed coaxially with rotation shaft 443b.

Arm 443h extends radially outward from a lower end of cylinder 443e.

Engagement shaft 443g extends downward from a radially outer end of arm 443h to be parallel to rotation shaft 443b (rotation axis RC).

Fitting protrusion 443j is formed at an upper end of cylinder 443e to protrude radially. As can be seen from part (c) of FIG. 10A, fitting protrusion 443j of engagement member 443 has, when viewed axially, such a shape that parallel side parts of a disk are cut off with rotation axis RC between the parallel side parts.

Figure 10B:
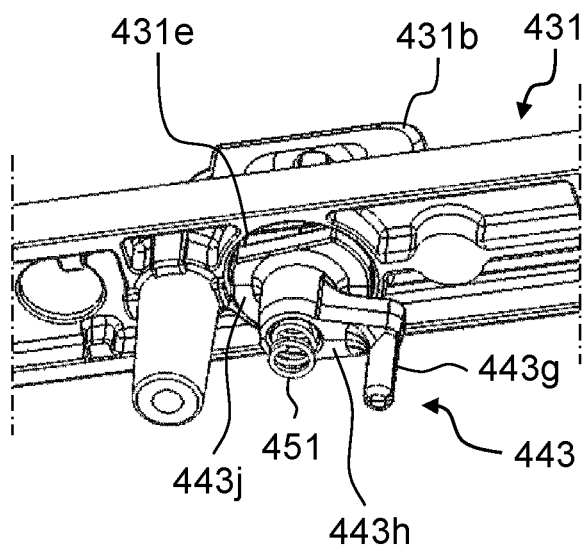
FIG. 10B is a view of the engagement member seen from an underside of a support member.
Figure 10B:
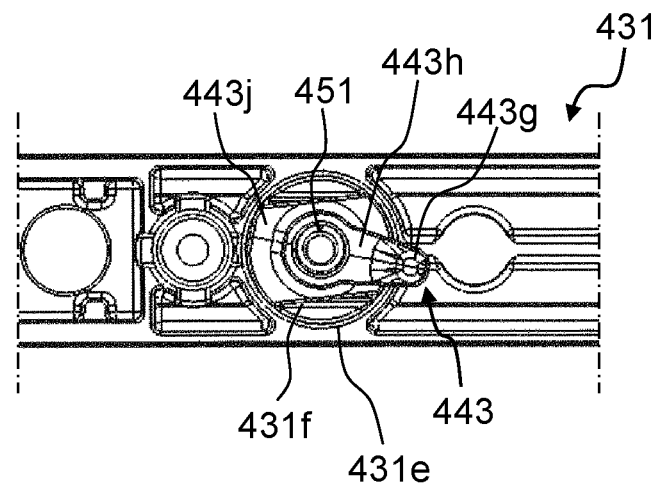

FIG. 10B is a view of engagement member 443 seen from an underside of support member 431. Specifically, part (a) of FIG. 10B is a perspective view, and part (b) of FIG. 10B is a bottom view.

Support member 431 is provided with, in its underside, first fitting recess 431e and second fitting recess 431f.

First fitting recess 431e is circular in shape when viewed along a direction perpendicular to the underside of support member 431. A diameter of a circle of first fitting recess 431e is set slightly larger than a diameter of fitting protrusion 443j of engagement member 443. Engagement member 443 is rotatable around the rotation axis with fitting protrusion 443j of engagement member 443 fitted in first fitting recess 431e.

When viewed along the underside of support member 431, second fitting recess 431f has substantially the same shape as fitting protrusion 443j of engagement member 443 that is viewed along the rotation axis, and a size of second fitting recess 431f is set slightly larger than a size of fitting protrusion 443j of engagement member 443. When engagement member 443 is located at the second rotational position, fitting protrusion 443j of engagement member 443 can be fitted in second fitting recess 431f. In other words, with fitting protrusion 443j of engagement member 443 fitted in second fitting recess 431f, engagement member 443 cannot rotate about rotation axis RC. Parts (a) and (b) of FIG. 10B illustrate fitting protrusion 443j of engagement member 443 that has rotated slightly from the second rotational position toward the first rotational position within first fitting recess 431e.

Figure 11A:
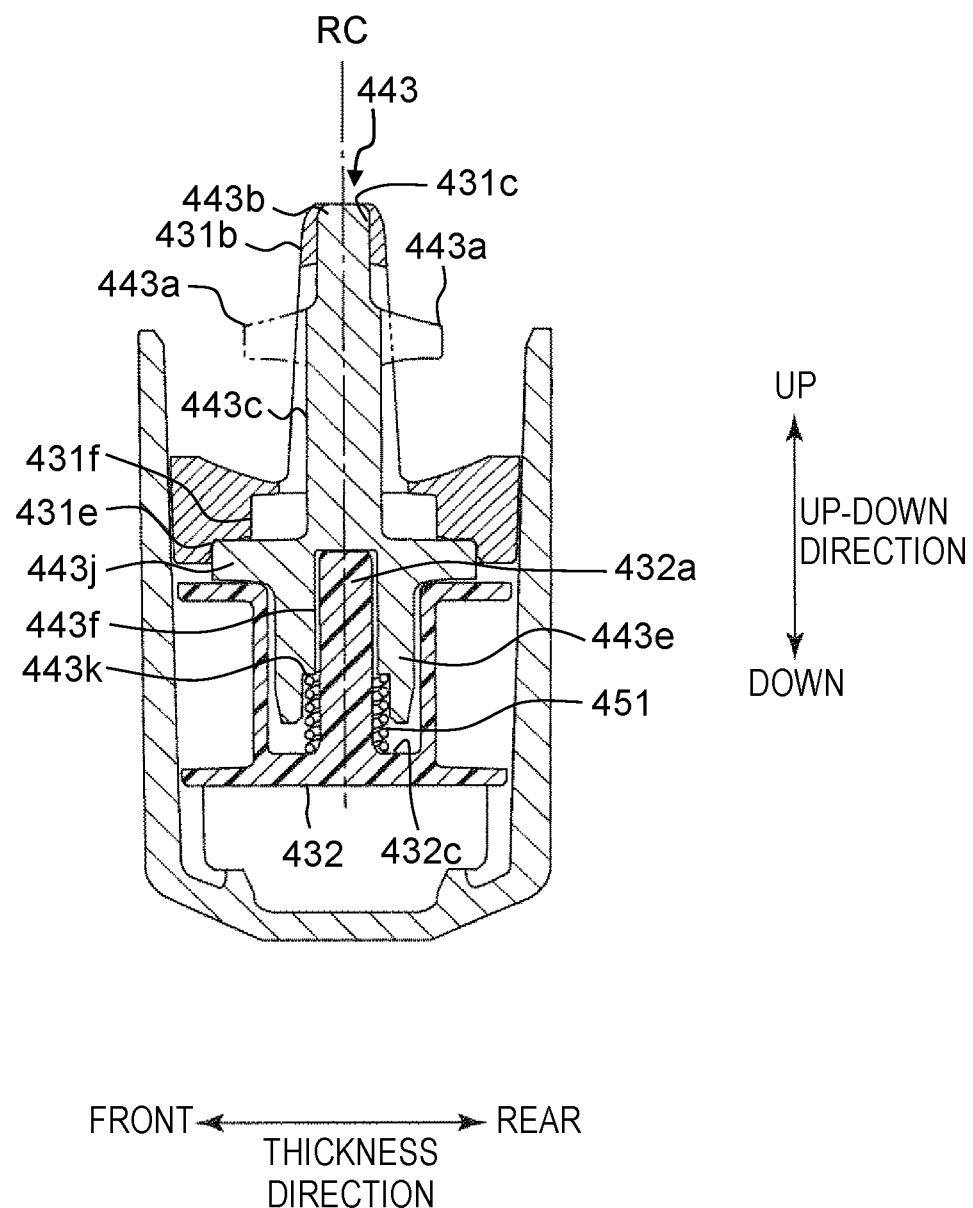
FIG. 11A is a sectional view taken along line C-C of FIG. 5B.
Figure 11B:
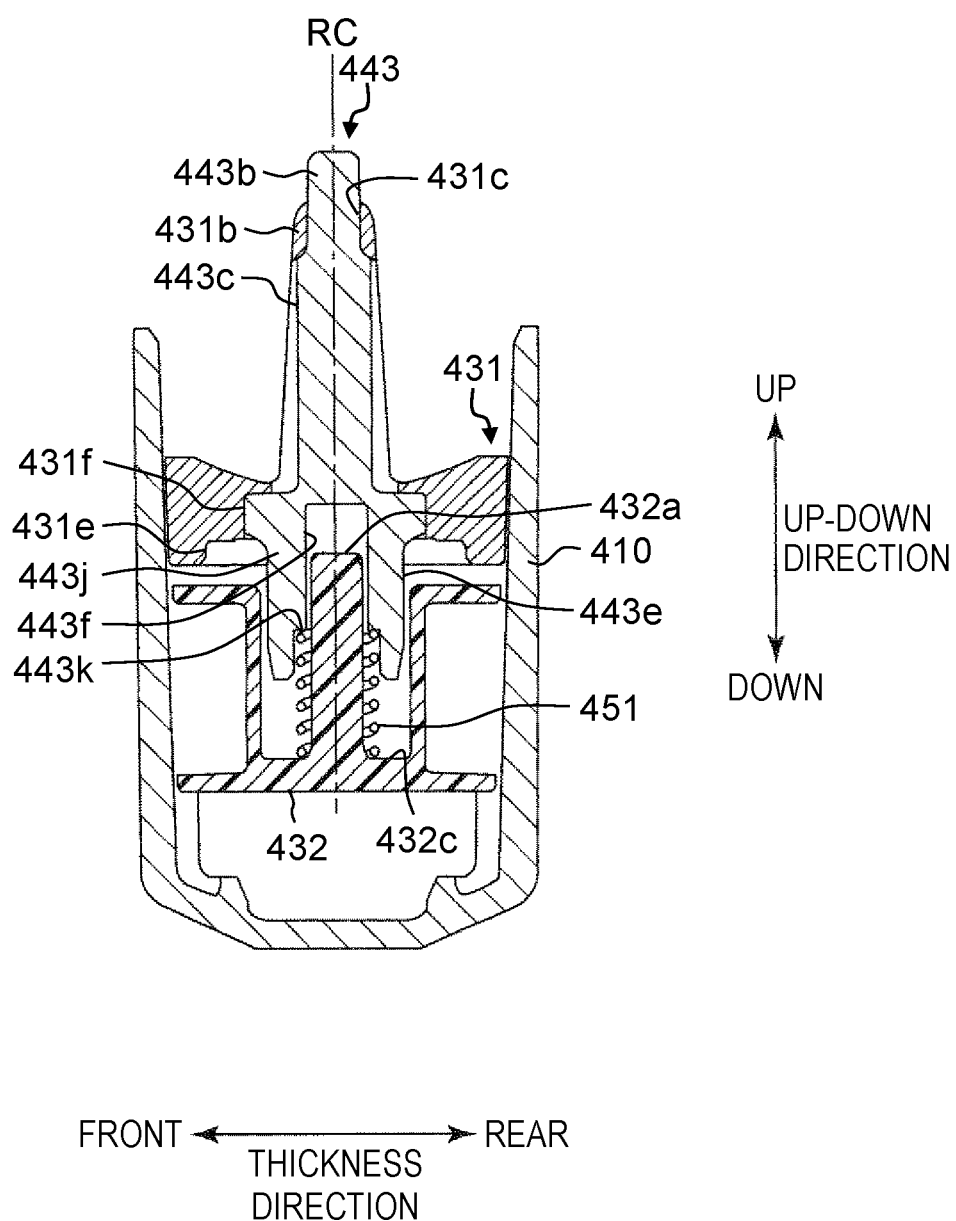
FIG. 11B is a sectional view taken along line D-D of FIG. 6B.

FIG. 11A is a sectional view taken along line C-C of FIG. 5B. FIG. 11A illustrates a state when engagement member 443 is located at the first rotational position. FIG. 11B is a sectional view taken along line D-D of FIG. 6B. FIG. 11B illustrates a state when engagement member 443 is located at the second rotational position. Rotation shaft 443b of engagement member 443 is passed through insertion hole 431c of engagement member support 431b. Shaft hole 443f of engagement member 443 fits rotation center shaft 432a of base member 432. As described above, shaft hole 443f is formed coaxially with rotation shaft 443b. Therefore, engagement member 443 is rotatable on, as rotation axis (center) RC, a center of rotation shaft 443b and a center of shaft hole 443f.

Engagement member 443 is movable between a first axial position and a second axial position in the up-down direction. In FIG. 11A, engagement member 443 is located at the second axial position. At this time, fitting protrusion 443j of engagement member 443 is fitted in first fitting recess 431e of support member 431. However, fitting protrusion 443j is not fitted in second fitting recess 431f of support member 431. In FIG. 11B, engagement member 443 is located at the first axial position. At this time, fitting protrusion 443j is fitted in second fitting recess 431f.

Second spring 451 is formed of a coil spring and is fitted over rotation center shaft 432a of base member 432. Second spring 451 has one end abutting on bottom surface 432c of base member 432. Second spring 451 has the other end abutting on spring abutment 443k that is formed by stepping shaft hole 443f of engagement member 443. Second spring 451 urges engagement member 443 toward the second axial position along rotation axis RC.

[1-2-5. Holding Mechanism]

Figure 14:
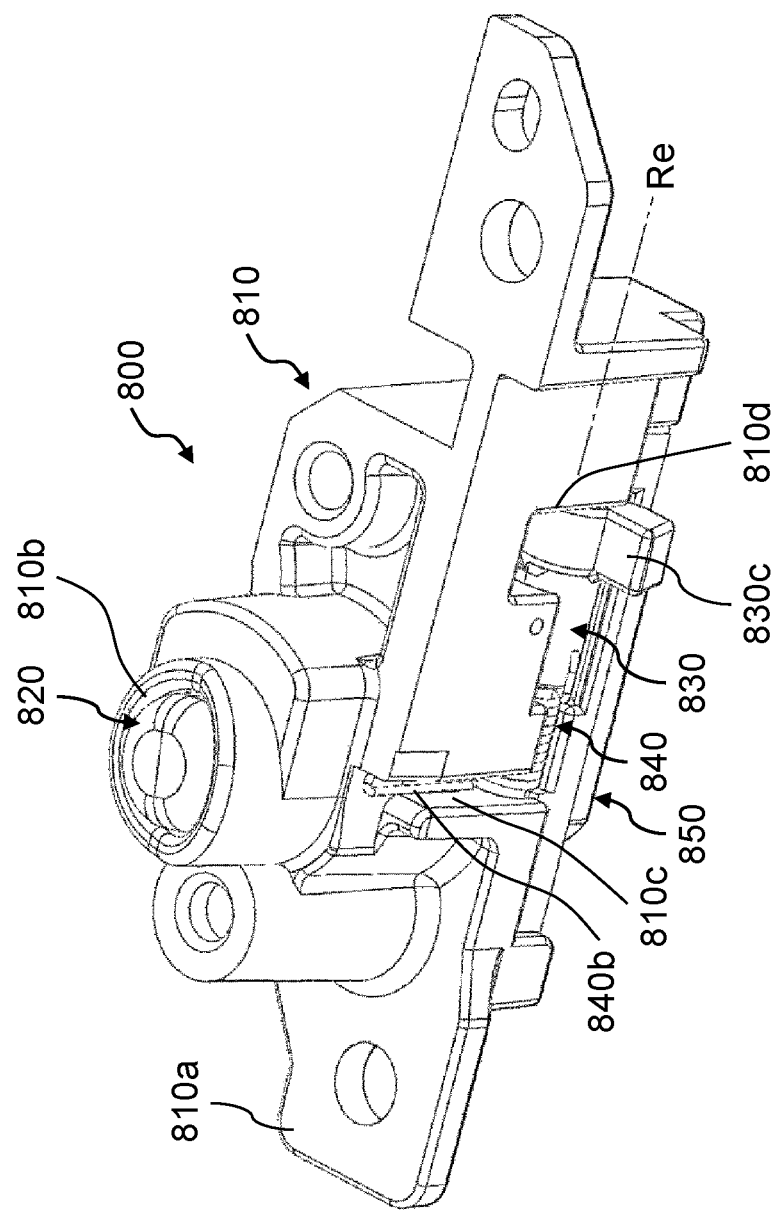
FIG. 14 is a perspective view of a holding mechanism.
Figure 15:
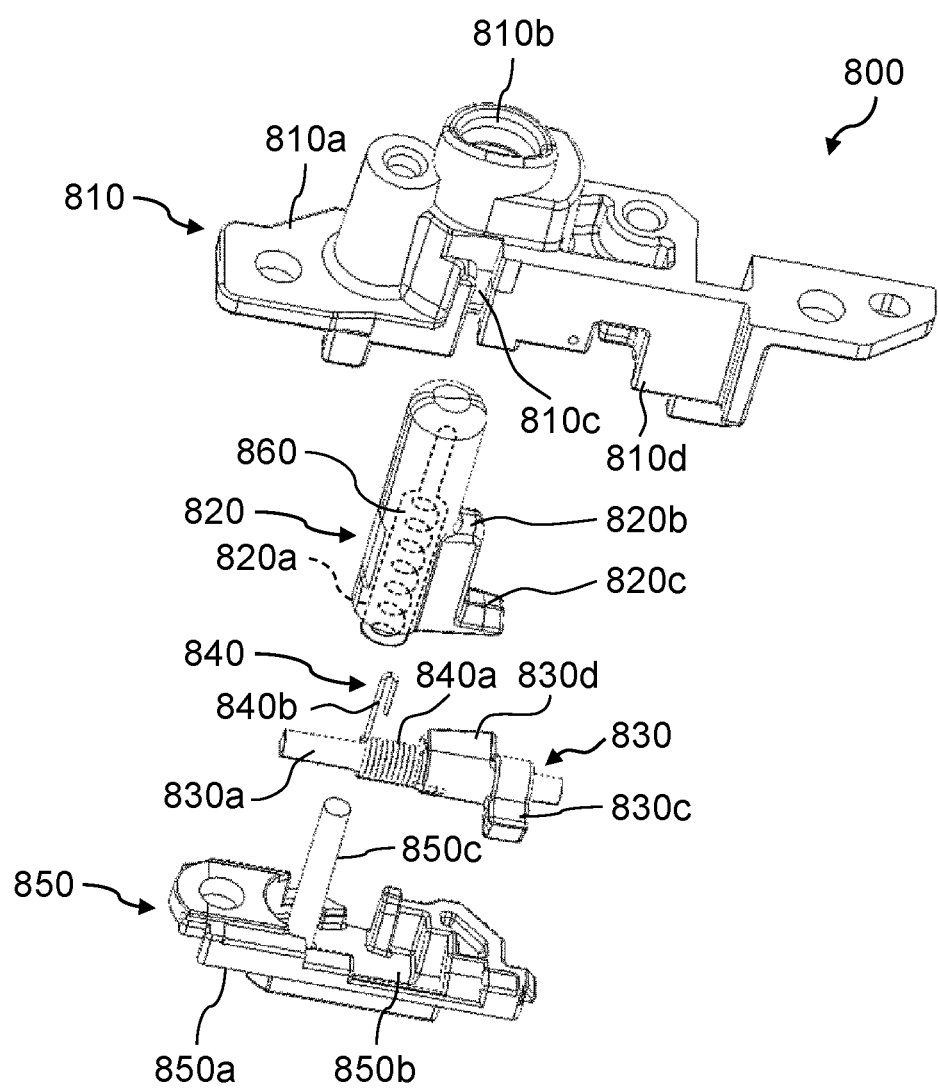
FIG. 15 is an exploded perspective view of the holding mechanism

Next, a description will be given of a configuration of holding mechanism 800. FIG. 14 is a perspective view of holding mechanism 800. FIG. 15 is an exploded perspective view of holding mechanism 800.

Holding mechanism 800 includes upper case 810, lower case 850, up-down moving pin 820, oscillation member 830, fourth spring 840, and fifth spring 860.

Upper case 810 includes main body 810a, up-down moving pin guide hole 810b that passes through main body 810a in the up-down direction, groove-shaped spring lock 810c that extends in the up-down direction, and oscillation member disposition recess 810d provided on an underside of main body 810a.

Up-down moving pin 820 is a bottomed cylindrical member that opens at a lower part. Up-down moving pin 820 includes spring disposition hole 820a that extends in the up-down direction, protrusion for regulating protrusion 820b that protrudes from a side, and pressing part 820c that protrudes from a lower end in a direction perpendicular to a longitudinal direction of up-down moving pin 820. Up-down moving pin 820 is inserted into up-down moving pin guide hole 810b of upper case 810 so as to be movable between an upper position and a lower position in the up-down direction. Upward movement of up-down moving pin 820 beyond the upper position is regulated when protrusion for regulating protrusion 820b abuts on an abutment (not illustrated) within upper case 810. As illustrated in FIGS. 5B and 6B, up-down moving pin 820 is disposed near engagement part 440. As illustrated in FIGS. 5B and 6B, up-down moving pin 820 moves between the lower position where an upper end of up-down moving pin 820 is located substantially the same as the upper surface of support member 431 of holder 400 and the upper position where the upper end of up-down moving pin 820 protrudes upward from the upper surface of support member 431 of holder 400. The upper end of up-down moving pin 820 is located substantially the same as the upper surface of support member 431 of holder 400 when tablet unit 100 is attached to holder 400. In FIGS. 5B and 6B, illustration of tablet unit 100 is omitted.

Oscillation member 830 includes oscillation shaft 830a, projection 830c that protrudes from oscillation shaft 830a perpendicularly to an axial direction, and pressure receiver 830d that protrudes from oscillation shaft 830a perpendicularly to the axial direction to a side roughly opposite to projection 830c.

Lower case 850 includes main body 850a, oscillation member disposition recess 850b formed on an upper surface of main body 850a to dispose oscillation member 830, and spring disposition pin 850c that extends upward from main body 850a. In oscillation member disposition recess 850b, oscillation member 830 is disposed to be rotatable around oscillation shaft 830a with oscillation shaft 830a being parallel to a left-right direction.

Fourth spring 840 includes coil spring 840a and lock 840b that extends from one end of coil spring 840a. Fourth spring 840 fits oscillation shaft 830a of oscillation member 830. Lock 840b is locked in spring lock 810c of upper case 810. Fourth spring 840 urges projection 830c of oscillation member 830 toward a lower end position.

Fifth spring 860 is a coil spring. Fifth spring 860 is housed in spring disposition hole 820a of up-down moving pin 820 and fits spring disposition pin 850c of lower case 850. An upper end of fifth spring 860 abuts on an upper end of spring disposition hole 820a. A lower end of fifth spring 860 abuts on a bottom surface of oscillation member disposition recess 850b of lower case 850. Fifth spring 860 urges up-down moving pin 820 toward the upper position.

Figure 16A:
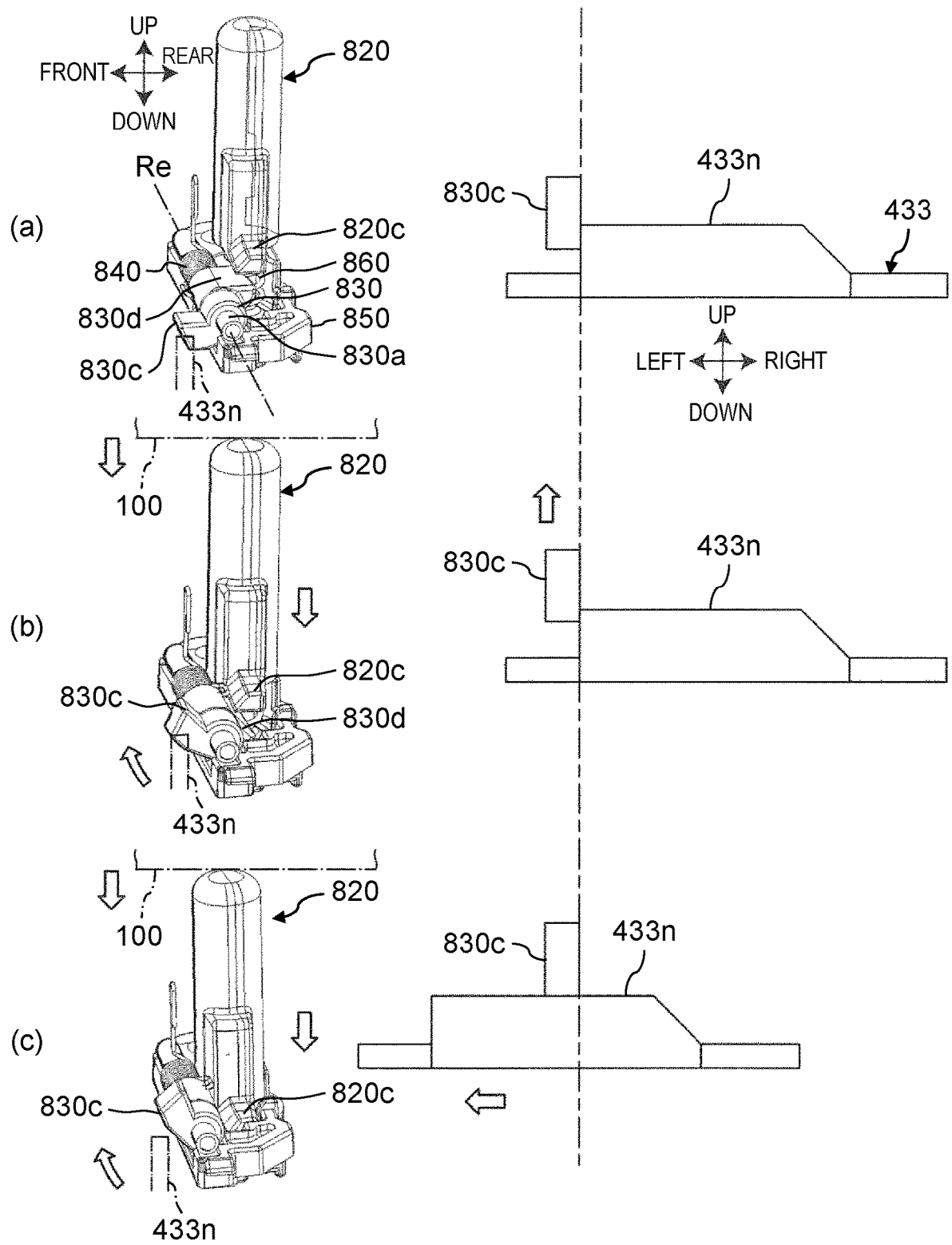
FIG. 16A is an operation description view of the holding mechanism.
Figure 16B:
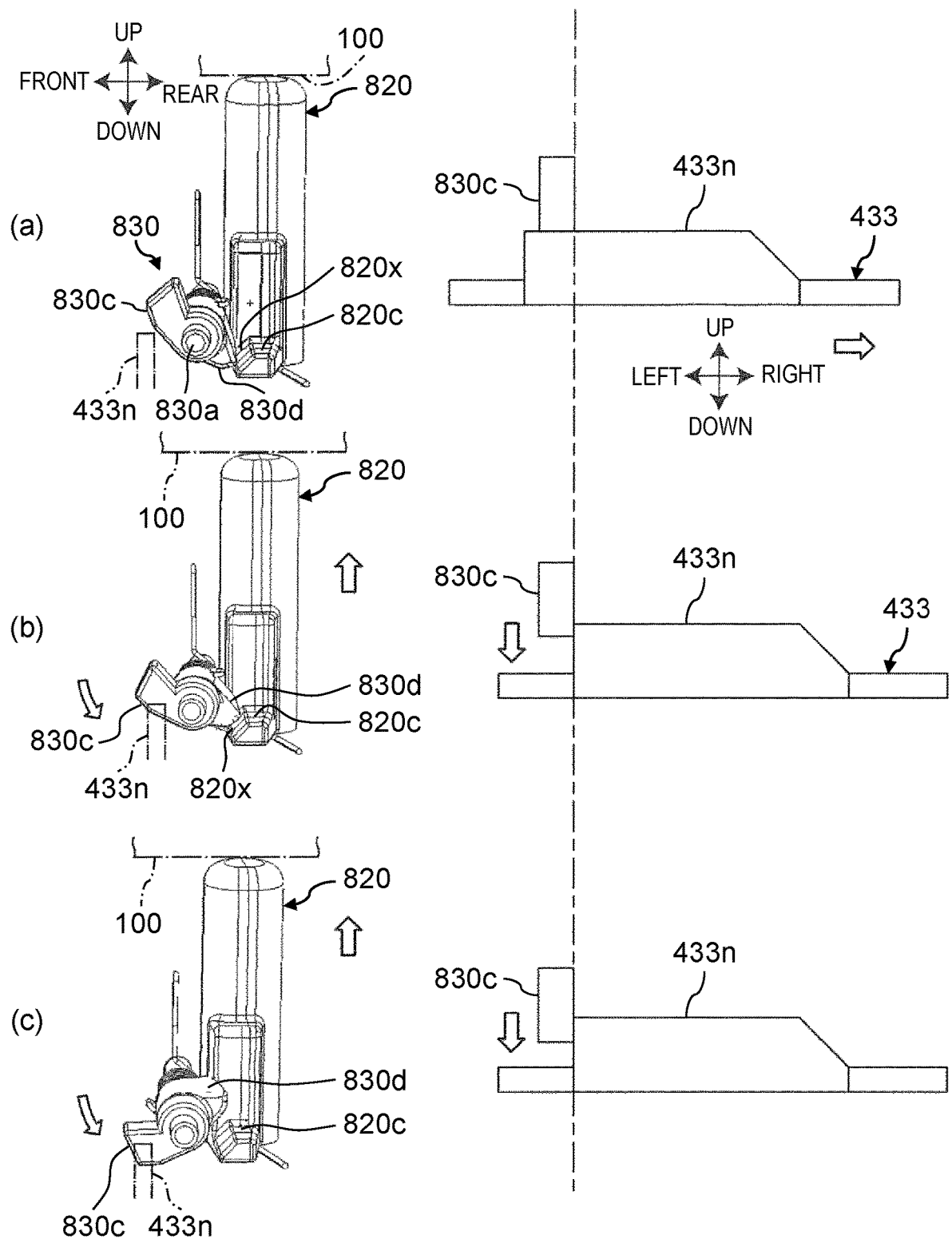
FIG. 16B is an operation description view of the holding mechanism.
Figure 16C:
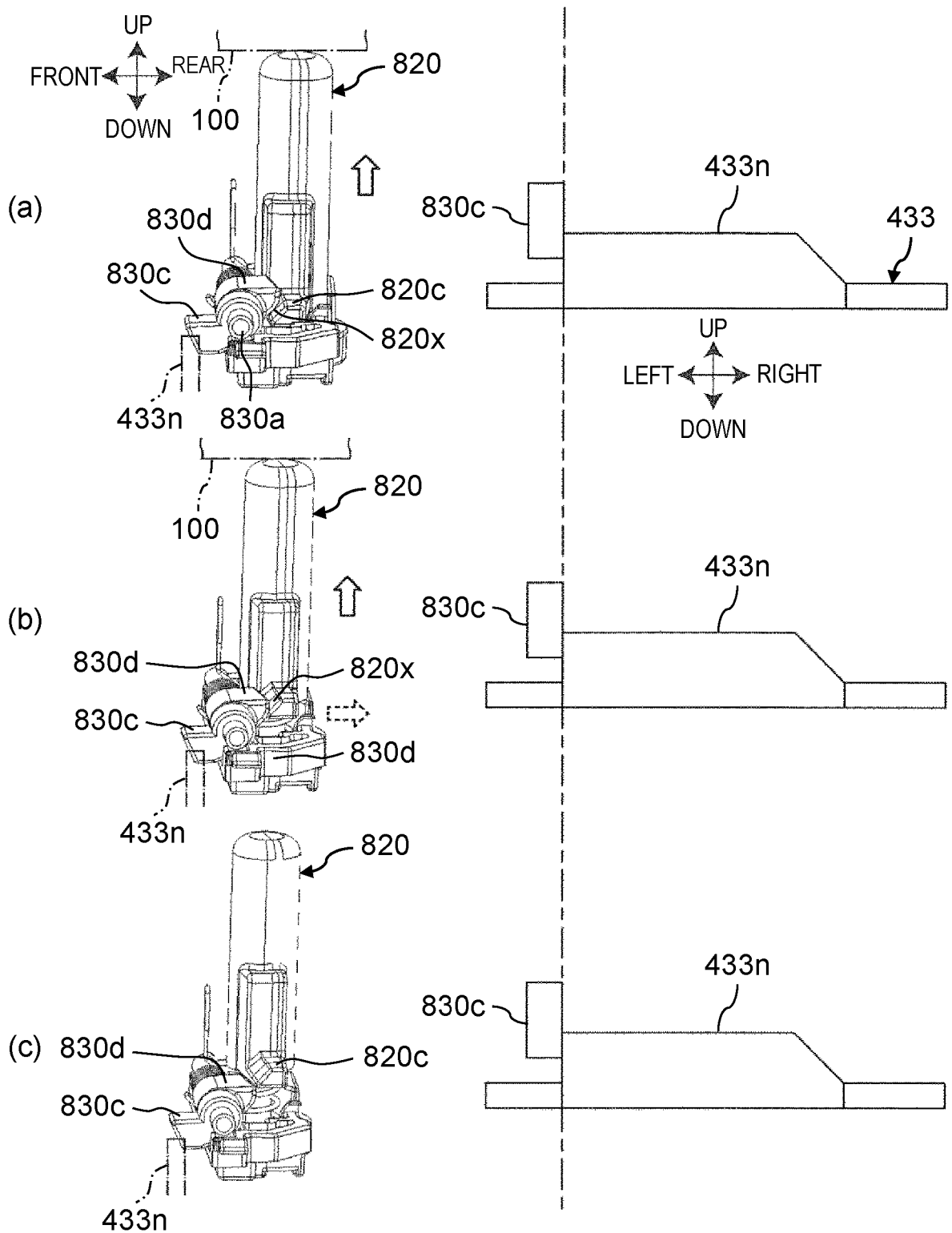
FIG. 16C is an operation description view of the holding mechanism.
Figure 16D:
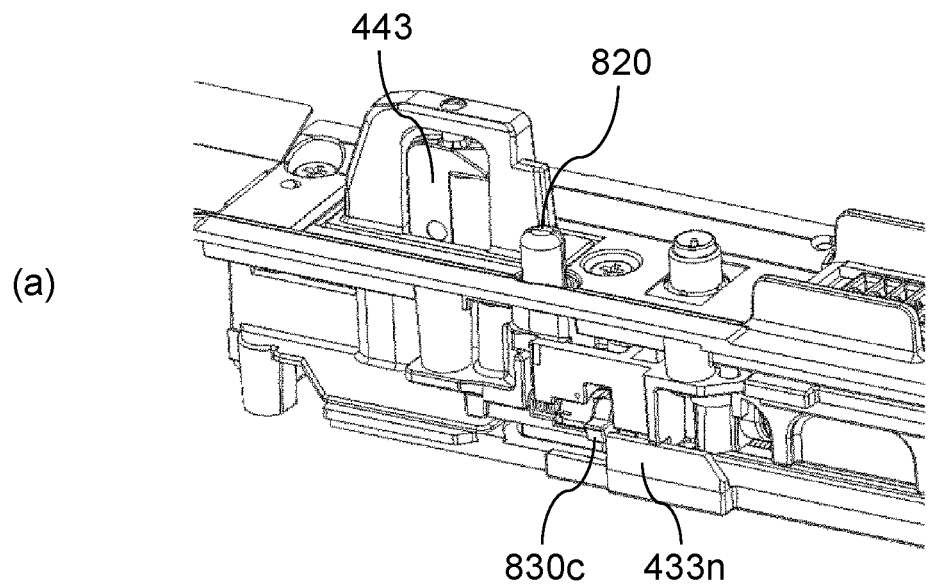
FIG. 16D is an operation description view of the holding mechanism.
Figure 16D:
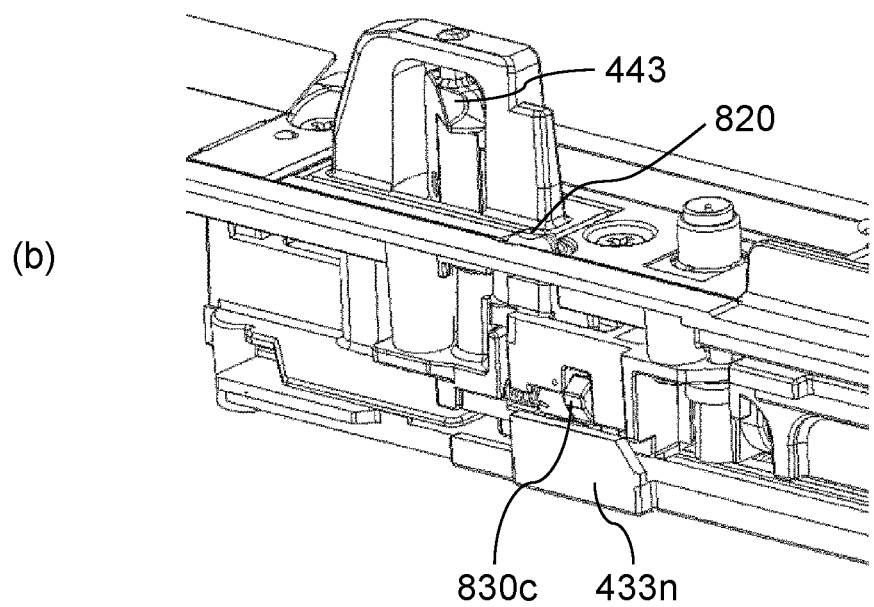

Next, operation of holding mechanism 800 will be described. First, operation of holding mechanism 800 when tablet unit 100 is attached to holder 400 will be described with reference to FIGS. 16A and 16D. FIG. 16A is an operation description view of holding mechanism 800 when tablet unit 100 is attached to holder 400. FIG. 16D is an operation description view of holding mechanism 800.

Part (a) of FIG. 16A and part (a) of FIG. 16D each illustrate a state of holding mechanism 800 when tablet unit 100 is not attached to holder 400. At this time, up-down moving pin 820 is located at the upper position by being urged by fifth spring 860 and protrudes from the upper surface of base 431a of support member 431 (see FIG. 5B). Further, pressing part 820c of up-down moving pin 820 is located above oscillation member 830. Oscillation member 830 rotates counterclockwise around oscillation axis Re due to urging force of fourth spring 840. With this configuration, projection 830c is located at the lower end position. Coupling member 433 is pulled by first spring 434 toward the first moving position (left). At this time, a left end of oscillation control wall 433n abuts on projection 830c of oscillation member 830. Coupling member 433 is thus located at the second moving position (Ms2 (see FIG. 12)). Accordingly, engagement member 443 is located at the second rotational position, and the lock mechanism is unlocked. On the other hand, operation member 420 is relatively movable to coupling member 433 and is pulled by third spring 470 toward the first position (Psi (see FIG. 12)). Accordingly, operation member 420 is located at the first position (Ps1). In other words, when holding mechanism 800 is in the state illustrated in part (a) of FIG. 16A, the lock mechanism is in a state illustrated in part (b) of FIG. 12.

As illustrated in part (b) of FIG. 16A, when attachment of tablet unit 100 to holder 400 is started, the lower side surface of tablet unit 100 abuts on the upper end of up-down moving pin 820, and up-down moving pin 820 starts to descend. When up-down moving pin 820 starts to descend, pressing part 820c located at the lower end abuts on pressure receiver 830d of oscillation member 830. As a result, oscillation member 830 starts to rotate clockwise around oscillation axis Re in part (b) of FIG. 16A. Further, because of this rotation, projection 830c of oscillation member 830 starts to move upward along the left end of oscillation control wall 433n.

When attachment of tablet unit 100 to holder 400 is completed, as illustrated in part (c) of FIG. 16A and part (b) of FIG. 16D, up-down moving pin 820 further descends and moves to the lower position. At this time, when pressing part 820c further pushes down pressure receiver 830d of oscillation member 830, oscillation member 830 further rotates around oscillation axis Re. Then, projection 830c of oscillation member 830 is moved to a position higher than an upper end of oscillation control wall 433n. In other words, movement regulation of oscillation control wall 433n by projection 830c is released. Therefore, coupling member 433 is moved left to the first moving position (Ms1) by urging force of first spring 434. As a result, engagement member 443 rotates at the first rotational position. The lock mechanism is thereby locked.

Next, operation of holding mechanism 800 when operation member 420 is moved from the first position to the second position with tablet unit 100 attached to holder 400 will be described with reference to FIG. 16B. FIG. 16B illustrates the operation of holding mechanism 800 when operation member 420 is moved from the first position to the second position with tablet unit 100 attached to holder 400. In FIG. 16B, lower case 850 is not illustrated to facilitate understanding of the operation.

As illustrated in part (a) of FIG. 16B, when movement of operation member 420 toward the second position is started by user's operation, coupling member 433 is pulled and moved toward the second position via connecting member 421. Because of this movement, projection 830c of oscillation member 830 moves relatively to the left along the upper end of oscillation control wall 433n. A positional relationship between the parts of up-down moving pin 820 and the parts of oscillation member 830 is the same as the positional relationship in part (c) of FIG. 16A. More specifically, a tip of pressure receiver 830d of oscillation member 830 is in contact with a lower end of inclined surface 820x of pressing part 820c of up-down moving pin 820.

As illustrated in part (b) of FIG. 16B, when operation member 420 is moved to the second position by the user's operation, projection 830c of oscillation member 830 further moves relatively to the left along the upper end of oscillation control wall 433n. Then, when projection 830c of oscillation member 830 reaches the left end of oscillation control wall 433n, due to the urging force of fourth spring 840, oscillation member 830 rotates clockwise around oscillation axis Re in part (b) of FIG. 16B. At this time, the tip of pressure receiver 830d of oscillation member 830 moves upward along inclined surface 820x of pressing part 820c of up-down moving pin 820. As illustrated in part (c) of FIG. 16B, pressing part 820c of up-down moving pin 820 is located below oscillation member 830. Further, as illustrated in part (b) of FIG. 16B, projection 830c of oscillation member 830 moves downward along the left end of oscillation control wall 433n and further moves to the lower end position as illustrated in part (c) of FIG. 16B. A state in part (c) of FIG. 16B is similar to a state in part (a) of FIG. 16D. However, up-down moving pin 820 is located at the upper position in part (a) of FIG. 16D, whereas up-down moving pin 820 is pushed down by tablet unit 100 and located at the lower position in part (c) of FIG. 16B. When the user's hand is released, coupling member 433 is pulled by first spring 434 toward the first moving position (left). However, as illustrated in part (c) of FIG. 16B, since the left end of oscillation control wall 433n abuts on projection 830c of oscillation member 830, coupling member 433 is held at the second moving position. Accordingly, engagement member 443 is located at the second rotational position, and the lock mechanism is held in an unlocked state. On the other hand, operation member 420 is relatively movable to coupling member 433 and is pulled by third spring 470 toward the first position. As a result, when the user's hand is released, operation member 420 returns to the first position. In other words, after the user's hand is released, the lock mechanism is in the state illustrated in part (b) of FIG. 12. Note that, before the user's hand is released, the lock mechanism is in the state illustrated in part (c) of FIG. 12.

Therefore, upon detachment of tablet unit 100 from holder 400, the user does not need to hold operation member 420 with operation member 420 moved to the second position (unlocked position). This eliminates, for example, the need to hold operation member 420 at the second position (unlocked position) with one hand while pulling tablet unit 100 out of holder 400 with the other hand. As a result, user's convenience is improved during detachment of tablet unit 100 from holder 400.

Next, after the operation of moving operation member 420 from the first position to the second position is performed as illustrated in FIG. 16B, operation of holding mechanism 800 when tablet unit 100 is detached from holder 400 will be described with reference to FIG. 16C. FIG. 16C is an operation description view of holding mechanism 800 when tablet unit 100 is detached from holder 400.

As illustrated in part (a) of FIG. 16C, when lifting of tablet unit 100 from holder 400 is started, up-down moving pin 820 is started to move upward by upward urging force of fifth spring 860 with the upper end of up-down moving pin 820 in contact with the lower side surface of tablet unit 100. Further, inclined surface 820x of pressing part 820c of up-down moving pin 820 abuts on an underside of pressure receiver 830d of oscillation member 830 during the upward movement.

When tablet unit 100 is further lifted from holder 400, as illustrated in part (b) of FIG. 16C, up-down moving pin 820 continues to rise further due to the upward urging force of fifth spring 860. At this time, the underside of pressure receiver 830d of oscillation member 830 abuts on inclined surface 820x of pressing part 820c of up-down moving pin 820. Because of this abutment, while the lower end of up-down moving pin 820 is displaced rearward, the underside of pressure receiver 830d and inclined surface 820x of pressing part 820c of up-down moving pin 820 slide against each other, so that up-down moving pin 820 moves upward.

Then, as illustrated in part (c) of FIG. 16C, tablet unit 100 is further lifted from holder 400 until the detachment is completed. At this time, up-down moving pin 820 rises until pressing part 820c of up-down moving pin 820 is located above pressure receiver 830d.

In any of the states illustrated in parts (a), (b), and (c) of FIG. 16C, oscillation member 830 does not rotate counterclockwise by being urged by the clockwise urging force of fourth spring 840. Accordingly, projection 830c is kept located at the lower end position. At this time, coupling member 433 is pulled by first spring 434 toward the first moving position (left). However, since the left end of oscillation control wall 433n abuts on projection 830c of oscillation member 830, coupling member 433 is held at the second moving position. As a result, engagement member 443 is located at the second rotational position, and the lock mechanism is held in the unlocked state. On the other hand, operation member 420 is relatively movable to coupling member 433 and is pulled by third spring 470 toward the first position. As a result, after the user's hand is released, operation member 420 is kept at the first position. In other words, in any of the states illustrated in parts (a), (b), and (c) of FIG. 16C, the lock mechanism is in the state illustrated in part (b) of FIG. 12.

[1-3. Operation of Entire Lock Mechanism]

FIG. 12 is an operation description view of the lock mechanism. FIG. 13A is a view for illustrating engagement of engagement part 440 on a right side in the width direction. Specifically, part (a) of FIG. 13A is a plan view illustrating the engagement, and part (b) of FIG. 13A is a sectional view taken along line E-E of part (a). FIG. 13B is a view for illustrating disengagement of engagement part 440 on the right side in the width direction. Specifically, part (a) of FIG. 13B is a plan view illustrating the disengagement, and part (b) of FIG. 13B is a sectional view taken along line F-F of part (a).

In part (c) of FIG. 12, operation member 420 is located at the first position (illustrated as "Ps1" in the drawing), and coupling member 433 is located at the first moving position (illustrated as "Ms1" in the drawing). At this time, engagement shafts 443g of engagement members 443 are respectively positioned in right ends of grooves 433a, 433b of coupling member 433. Then, when engagement shaft 443g is moved to the front in a thickness direction by groove 433a, 433b, engagement member 443 is positioned at the first rotational position. At this time, as illustrated in parts (a) and (b) of FIG. 13A, engagement projections 443a of engagement member 443 engage with engagement recesses 121b of engaging target part 130 of tablet unit 100. Tablet unit 100 is thus locked in holder 400. At this time, an upper end of rotation shaft 443b of engagement member 443 abuts on flat surface 123b of protection member 123 of engagement recess 121b of tablet unit 100. With this configuration, engagement member 443 is pushed downward against urging force of second spring 451 and is located at the first axial position. Moreover, fitting protrusion 443j fits in first fitting recess 431e of support member 431.

When operation member 420 is moved from this state to second position Ps2 illustrated in part (a) of FIG. 12, coupling member 433 moves to the second moving position. As a result, engagement shaft 443g of engagement member 443 is positioned in a left end of groove 433a, 433b of coupling member 433. Then, when engagement shafts 443g are moved to the rear in the thickness direction by grooves 433a, 433b, engagement members 443 are positioned at the second rotational positions. At this time, as illustrated in parts (a) and (b) of FIG. 13B, engagement projections 443a of engagement member 443 are disengaged from engagement recesses 121b of engaging target part 130 of tablet unit 100. Therefore, tablet unit 100 is unlocked from holder 400, and thus tablet unit 100 can be removed from keyboard unit 200.

At this time, engagement member 443 is urged upward by the urging force of second spring 451 and is held in the second rotational position by holding mechanism 800. When tablet unit 100 is lifted by a user, engagement member 443 is pushed upward (second axial position) by the urging force of second spring 451. In addition, fitting protrusion 443j fits in second fitting recess 431f of support member 431. In this way, the rotation of engagement member 443 on rotation axis RC is also restricted by this fitting. In other words, after operation member 420 is operated at the second position, engagement member 443 is held at the second rotational position by not only holding mechanism 800 but also this fitting structure. As a result, not only after operation member 420 is operated at the second position, but also after tablet unit 100 is removed, the unlocked state can be held favorably. Upon subsequent attachment of tablet unit 100 to holder 400, tablet unit 100 can be attached without operating operation member 420 at the second position. Therefore, the user-friendliness is improved.

A description is given next of a case where holder 400 that is not mounted with tablet unit 100 is mounted with tablet unit 100. As tablet unit 100 is inserted into holder 400, flat surface 123b of protection member 123 of tablet unit 100 abuts first against the upper end of rotation shaft 443b of engagement member 443. As tablet unit 100 is inserted further into holder 400, flat surface 123b of protection member 123 that abuts against the upper end of rotation shaft 443b of engagement member 443 pushes engagement member 443 downward. Then, fitting protrusion 443j of engagement member 443 is pushed down from the position of first fitting recess 431e to the position of second fitting recess 431f of support member 431. In other words, engagement member 443 is pushed down to the first axial position. At this time, fitting protrusion 443j of engagement member 443 is disengaged from second fitting recess 431f of support member 431. This releases rotation restriction of engagement member 443. Engagement member 443 is rotatable around the rotation axis within first fitting recess 431e. Further, since engagement member 443 is rotatable, coupling member 433 is movable in the width direction. As described above, coupling member 433 is urged (pulled) by first spring 434 toward the first moving position. Accordingly, coupling member 433 moves toward the first moving position. With the movement of coupling member 433, engagement member 443 rotates to the first rotational position. As a result, as illustrated in parts (a) and (b) of FIG. 13A, engagement projections 443a of engagement member 443 engage with engagement recesses 121b of engaging target part 130 of tablet unit 100. Tablet unit 100 is thus locked in holder 400.

[1-4. Unlock Display]

In the present exemplary embodiment, operation member 420 and coupling member 433 are relatively rotatable. In addition, operation member 420 is located toward the first position by third spring 470 regardless of whether or not the lock mechanism is locked. Because of this, it is not possible to determine whether the lock mechanism is locked currently by the position of operation member 420 alone. Therefore, the present exemplary embodiment adopts the following configuration to allow a user to recognize whether the lock mechanism is locked.

Figure 17A:
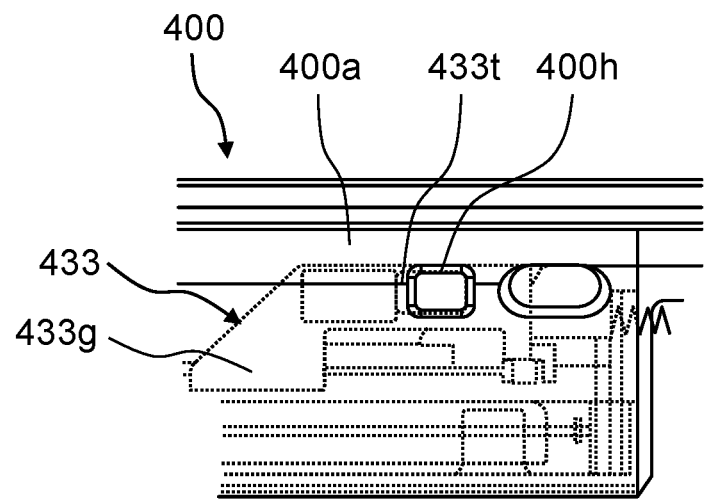
FIG. 17A is a view for explaining an unlock display indicating a locked state.
Figure 17B:
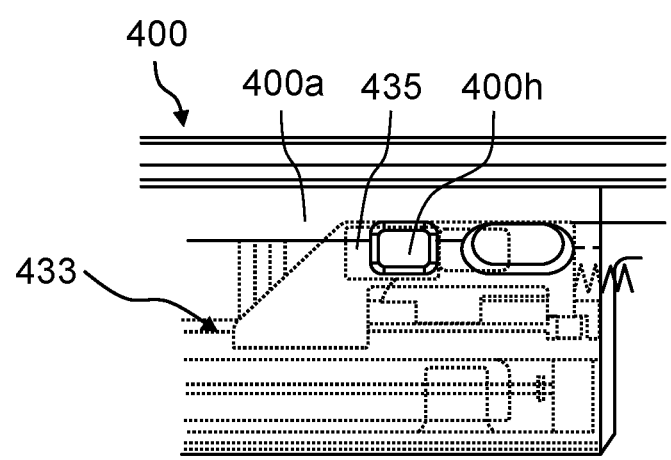
FIG. 17B is a view for explaining the unlock display indicating an unlocked state.

FIG. 17A is a view for explaining a lock display. FIG. 17B is a view for explaining an unlock display. Opening 400h for unlock display is provided on front surface 400a of holder 400. As illustrated in FIG. 17B, the unlock display includes, for example, red-colored seal 435 stuck to perpendicular surface 433g of coupling member 433. When coupling member 433 is located at the first moving position illustrated in FIG. 17A, a positional relationship between opening 400h for unlock display on front surface 400a of holder 400 and opening 433t provided on perpendicular surface 433g of coupling member 433 is set such that the both overlap each other. Further, when coupling member 433 is located at the second moving position illustrated in FIG. 17B, the positional relationship between opening 400h for unlock display on front surface 400a of holder 400 and seal 435 provided on perpendicular surface 433g of coupling member 433 is set such that the both overlap each other. With this configuration, when the lock mechanism is unlocked, the user can recognize the unlocking due to appearance of seal 435 through opening 400h. Further, when the lock mechanism is locked, since opening 400h for unlock display and opening 433t of coupling member 433 overlap each other, coupling member 433 cannot be touched from outside. Accordingly, by adopting the structure of appearing unlock warning seal 435 through opening 400h for unlock display on front surface 400a of holder 400, coupling member 433 cannot be touched from outside in the locked state. Hence, it is not possible to perform unlocking by touching and moving coupling member 433 of holder 400 in the locked state from outside. Tablet unit 100 thus cannot be removed from holder 400.

[2. Effects and Other Benefits]

Computer 1 (an example of an electronic device) of the present exemplary embodiment includes tablet unit 100 (first unit) having first electronic components and keyboard unit 200 (second unit) having second electronic components, tablet unit 100 (first unit) being detachably attached to keyboard unit 200 (second unit).

Tablet unit 100 (first unit) includes engaging target parts 130.

Keyboard unit 200 (second unit) includes a lock mechanism that locks tablet unit 100 (first unit) in an attached state.

The lock mechanism includes operation member 420 movable between a first position and a second position, engagement parts 440 engageable with engaging target parts 130, and drive mechanism 430 that drives engagement parts 440.

Drive mechanism 430 includes: coupling member 433 (moving member) provided movable between a first moving position and a second moving position parallel to a moving direction of operation member 420 and relatively movable to operation member 420, engagement parts 440 being moved to engagement positions when coupling member 433 (moving member) is located at the first moving position, and engagement parts 440 being moved to disengagement positions when coupling member 433 (moving member) is located at the second moving position; third spring 470 (first urging member) that urges operation member 420 to move to the first position; and first spring 434 (second urging member) that urges coupling member 433 (moving member) to move to the first moving position.

Coupling member 433 (moving member) is configured to move to the second moving position against urging of first spring 434 (second urging member) when operation member 420 is moved from the first position to the second position.

The lock mechanism further includes holding mechanism 800 that holds coupling member 433 (moving member) at the second moving position when operation member 420 is moved from the first position to the second position.

With this configuration, when operation member 420 is moved from the first position to the second position, coupling member 433 is held at the second moving position. In other words, engagement parts 440 and engaging target parts 130 are held in a disengaged state. As a result, it is possible to remove tablet unit 100 without using both hands simultaneously.

In the present exemplary embodiment, holding mechanism 800 includes: oscillation control wall 433n (protrusion) provided at coupling member 433 (moving member); and oscillation member 830 (displacement member) provided at holder 400 (predetermined part) of keyboard unit 200 (second unit), oscillation member 830 (displacement member) being displaced in a moving path of oscillation control wall 433n (protrusion) to abut on oscillation control wall 433n (protrusion) when operation member 420 is moved from the first position to the second position.

Holding mechanism 800 can thus be formed from a simple structure.

Other Exemplary Embodiments

The first exemplary embodiment has been described above as an example of the technique disclosed in the present disclosure. However, the technique of the present disclosure is not limited to the first exemplary embodiment, and also applicable to other exemplary embodiments that undergo some modifications, replacements, additions, and omissions, for example, as appropriate. In addition, new exemplary embodiments can also be achieved by combining the respective components described in the first exemplary embodiment. Thus, another exemplary embodiment will be described below as an example.

(1) In the above-described exemplary embodiment, engagement part 440 having rotational engagement member 443 has been described as an example. However, in the present disclosure, an engagement part may be formed by providing a hooked structure at a coupling member itself.

As described above, the exemplary embodiments have been described as examples of the techniques in the present disclosure. For that purpose, the accompanying drawings and the detailed description have been provided. The components illustrated in the accompanying drawings and described in the detailed description may include components essential for solving the problems, as well as components that are not essential for solving the problems but required to exemplify the above techniques. For this reason, it should not be immediately recognized that those unnecessary components are necessary just because those unnecessary components are described in the accompanying drawings and the detailed description. Also, since the aforementioned exemplary embodiments are for describing the technologies of the present disclosure as an example, various modifications, replacements, additions, omissions, and the like may be made within the scope of the claims or a scope equivalent thereto.

INDUSTRIAL APPLICABILITY

The present disclosure is widely applicable to an electronic device in which a first electronic device can be freely detached from a holder of a second electronic device.

What is claimed is:

1. An electronic device comprising:
a first unit having a first electronic component; and
a second unit having a second electronic component, the first unit being detachably attached to the second unit, wherein
the first unit has an engaging target part,
the second unit has a lock mechanism that locks the first unit in a state attached to the second unit,
the lock mechanism includes
an operation member movable between a first position and a second position,
an engagement part engageable with the engaging target part, and
a drive mechanism that drives the engagement part,
the drive mechanism includes
a moving member provided movable between a first moving position and a second moving position in a moving direction of the operation member and relatively movable to the operation member, the moving member causing the engagement part to be engaged with the engaging target part when the moving member is located at the first moving position, the moving member causing the engagement part to be disengaged from the engaging target part when the moving member is located at the second moving position,
a first urging member that urges the operation member to move to the first position, and
a second urging member that urges the moving member to move to the first moving position,
the moving member is configured to move to the second moving position against urging of the second urging member when the operation member is moved from the first position to the second position, and
the lock mechanism further has a holding mechanism that holds the moving member at the second moving position when the operation member is moved from the first position to the second position, and that releases movement regulation of the moving member held at the second moving position when the first unit is attached to the second unit.

2. The electronic device according to claim 1, wherein the holding mechanism includes
a protrusion provided at the moving member, and
a displacement member provided at a predetermined part of the second unit, the displacement member being displaced in a moving path of the protrusion to abut on the protrusion when the operation member is moved from the first position to the second position.

* * * * *